US012632114B2

(12) United States Patent
Chen et al.

(10) Patent No.: US 12,632,114 B2
(45) Date of Patent: May 19, 2026

(54) GAP SENSING VIA ENGINE COIL

(71) Applicant: Apple Inc., Cupertino, CA (US)

(72) Inventors: Denis G. Chen, San Jose, CA (US);
Darya Amin-Shahidi, Menlo Park, CA
(US)

(73) Assignee: Apple Inc., Cupertino, CA (US)

( * ) Notice: Subject to any disclaimer, the term of this
patent is extended or adjusted under 35
U.S.C. 154(b) by 25 days.

(21) Appl. No.: 18/144,075

(22) Filed: May 5, 2023

(65) Prior Publication Data

US 2024/0103624 A1    Mar. 28, 2024

Related U.S. Application Data

(60) Provisional application No. 63/409,746, filed on Sep.
24, 2022.

(51) Int. Cl.
*G06F 3/01* (2006.01)
*G01B 7/14* (2006.01)
*H02K 33/18* (2006.01)

(52) U.S. Cl.
CPC .............. *G06F 3/016* (2013.01); *G01B 7/14*
(2013.01); *H02K 33/18* (2013.01)

(58) Field of Classification Search
CPC ............. H03K 17/9622; H03K 17/962; H03K
2217/9651; G06F 3/016; H02K 33/18;
H02K 33/00; H02K 35/00; B06B 1/045
See application file for complete search history.

(56) References Cited

U.S. PATENT DOCUMENTS

| | | | |
|---|---|---|---|
| 3,001,049 A | 9/1961 | Didier | |
| 3,390,287 A | 6/1968 | Sonderegger | |
| 3,419,739 A | 12/1968 | Clements | |
| 4,236,132 A | 11/1980 | Zissimopoulos | |
| 4,412,148 A | 10/1983 | Klicker et al. | |
| 4,414,984 A | 11/1983 | Zarudiansky | |
| 4,490,815 A | 12/1984 | Umehara et al. | |
| 4,695,813 A | 9/1987 | Nobutoki et al. | |
| 4,975,616 A | 12/1990 | Park | |

(Continued)

FOREIGN PATENT DOCUMENTS

| | | |
|---|---|---|
| AU | 2015100710 | 7/2015 |
| AU | 2016100399 | 5/2016 |

(Continued)

OTHER PUBLICATIONS

Actuator definition downloaded from http://www.thefreedictionary.
com/actuator on May 3, 2018, 2 pages.

(Continued)

*Primary Examiner* — Mirza F Alam
(74) *Attorney, Agent, or Firm* — Brownstein Hyatt Farber
Schreck, LLP

(57) ABSTRACT

A haptic engine for an electronic device includes a coil
assembly and a stator. The coil assembly may be coupled to
an input structure, such as a button cap. In an gap sensing
mode, a first voltage may be driven through the coil assem-
bly to determine an impedance of the coil assembly. The
impedance is then used to determine a gap between the coil
assembly and the stator. In a haptic drive mode, a second
voltage is driven through the coil assembly to produce a
haptic output.

13 Claims, 17 Drawing Sheets

(56)                References Cited

U.S. PATENT DOCUMENTS

| | | | |
|---|---|---|---|
| 5,010,772 A | 4/1991 | Bourland |
| 5,245,734 A | 9/1993 | Issartel |
| 5,283,408 A | 2/1994 | Chen |
| 5,293,161 A | 3/1994 | MacDonald et al. |
| 5,317,221 A | 5/1994 | Kubo et al. |
| 5,365,140 A | 11/1994 | Ohya et al. |
| 5,434,549 A | 7/1995 | Hirabayashi et al. |
| 5,436,622 A | 7/1995 | Gutman et al. |
| 5,510,584 A | 4/1996 | Norris |
| 5,510,783 A | 4/1996 | Findlater et al. |
| 5,513,100 A | 4/1996 | Parker et al. |
| 5,587,875 A | 12/1996 | Sellers |
| 5,590,020 A | 12/1996 | Sellers |
| 5,602,715 A | 2/1997 | Lempicki et al. |
| 5,619,005 A | 4/1997 | Shibukawa et al. |
| 5,621,610 A | 4/1997 | Moore et al. |
| 5,625,532 A | 4/1997 | Sellers |
| 5,629,578 A | 5/1997 | Winzer et al. |
| 5,635,928 A | 6/1997 | Takagi et al. |
| 5,718,418 A | 2/1998 | Gugsch |
| 5,739,759 A | 4/1998 | Nakazawa et al. |
| 5,742,242 A | 4/1998 | Sellers |
| 5,783,765 A | 7/1998 | Muramatsu |
| 5,793,605 A | 8/1998 | Sellers |
| 5,812,116 A | 9/1998 | Malhi |
| 5,813,142 A | 9/1998 | Demon |
| 5,818,149 A | 10/1998 | Safari et al. |
| 5,844,983 A | 12/1998 | Lilja |
| 5,896,076 A | 4/1999 | Van Namen |
| 5,907,199 A | 5/1999 | Miller |
| 5,951,908 A | 9/1999 | Cui et al. |
| 5,959,613 A | 9/1999 | Rosenberg et al. |
| 5,973,441 A | 10/1999 | Lo et al. |
| 5,982,304 A | 11/1999 | Selker et al. |
| 5,982,612 A | 11/1999 | Roylance |
| 5,995,026 A | 11/1999 | Sellers |
| 5,999,084 A | 12/1999 | Armstrong |
| 6,035,257 A | 3/2000 | Epperson |
| 6,069,433 A | 5/2000 | Lazarus et al. |
| 6,078,308 A | 6/2000 | Rosenberg et al. |
| 6,104,947 A | 8/2000 | Heikkila et al. |
| 6,127,756 A | 10/2000 | Iwaki |
| 6,135,886 A | 10/2000 | Armstrong |
| 6,198,206 B1 | 3/2001 | Saarmaa |
| 6,218,966 B1 | 4/2001 | Goodwin |
| 6,219,033 B1 | 4/2001 | Rosenberg |
| 6,220,550 B1 | 4/2001 | McKillip, Jr. |
| 6,222,525 B1 | 4/2001 | Armstrong |
| 6,252,336 B1 | 6/2001 | Hall |
| 6,342,880 B2 | 1/2002 | Rosenberg et al. |
| 6,351,205 B1 | 2/2002 | Armstrong |
| 6,373,465 B2 | 4/2002 | Jolly et al. |
| 6,408,187 B1 | 6/2002 | Merriam |
| 6,411,276 B1 | 6/2002 | Braun et al. |
| 6,429,849 B1 | 8/2002 | An |
| 6,437,485 B1 | 8/2002 | Johansson |
| 6,438,393 B1 | 8/2002 | Surronen |
| 6,444,928 B2 | 9/2002 | Okamoto et al. |
| 6,455,973 B1 | 9/2002 | Ineson |
| 6,465,921 B1 | 10/2002 | Horng |
| 6,552,404 B1 | 4/2003 | Hynes |
| 6,552,471 B1 | 4/2003 | Chandran et al. |
| 6,557,072 B2 | 4/2003 | Osborn |
| 6,642,857 B1 | 11/2003 | Schediwy |
| 6,693,626 B1 | 2/2004 | Rosenberg |
| 6,717,573 B1 | 4/2004 | Shahoian et al. |
| 6,747,400 B2 | 6/2004 | Maichl et al. |
| 6,809,462 B2 | 10/2004 | Pelrine et al. |
| 6,809,727 B2 | 10/2004 | Piot et al. |
| 6,864,877 B2 | 3/2005 | Braun et al. |
| 6,906,697 B2 | 6/2005 | Rosenberg |
| 6,906,700 B1 | 6/2005 | Armstrong |
| 6,906,703 B2 | 6/2005 | Vablais et al. |
| 6,952,203 B2 | 10/2005 | Banerjee et al. |
| 6,954,657 B2 | 10/2005 | Bork et al. |
| 6,963,762 B2 | 11/2005 | Kaaresoja et al. |
| 6,965,189 B2 | 11/2005 | Menzel |
| 6,995,752 B2 | 2/2006 | Lu |
| 7,005,811 B2 | 2/2006 | Wakuda et al. |
| 7,016,707 B2 | 3/2006 | Fujisawa et al. |
| 7,022,927 B2 | 4/2006 | Hsu |
| 7,023,112 B2 | 4/2006 | Miyamoto et al. |
| 7,081,701 B2 | 7/2006 | Yoon et al. |
| 7,091,948 B2 | 8/2006 | Chang et al. |
| 7,121,147 B2 | 10/2006 | Okada |
| 7,123,948 B2 | 10/2006 | Nielsen |
| 7,130,664 B1 | 10/2006 | Williams |
| 7,136,045 B2 | 11/2006 | Rosenberg et al. |
| 7,158,122 B2 | 1/2007 | Roberts |
| 7,161,580 B2 | 1/2007 | Bailey et al. |
| 7,162,928 B2 | 1/2007 | Shank et al. |
| 7,170,498 B2 | 1/2007 | Huang |
| 7,176,906 B2 | 2/2007 | Williams et al. |
| 7,180,500 B2 | 2/2007 | Marvit et al. |
| 7,182,691 B1 | 2/2007 | Schena |
| 7,194,645 B2 | 3/2007 | Bieswanger et al. |
| 7,205,978 B2 | 4/2007 | Poupyrev |
| 7,217,891 B2 | 5/2007 | Fischer et al. |
| 7,218,310 B2 | 5/2007 | Tierling et al. |
| 7,219,561 B2 | 5/2007 | Okada |
| 7,253,350 B2 | 8/2007 | Noro et al. |
| 7,269,484 B2 | 9/2007 | Hein |
| 7,333,602 B2 | 2/2008 | Zernovizky et al. |
| 7,333,604 B2 | 2/2008 | Zernovizky et al. |
| 7,334,350 B2 | 2/2008 | Ellis |
| 7,348,968 B2 | 3/2008 | Dawson |
| 7,382,357 B2 | 6/2008 | Panotopoulos et al. |
| 7,388,741 B2 | 6/2008 | Konuma et al. |
| 7,392,066 B2 | 6/2008 | Hapamas |
| 7,423,631 B2 | 9/2008 | Shahoian et al. |
| 7,446,752 B2 | 11/2008 | Goldenberg et al. |
| 7,469,155 B2 | 12/2008 | Chu |
| 7,469,595 B2 | 12/2008 | Kessler et al. |
| 7,471,033 B2 | 12/2008 | Thiesen et al. |
| 7,495,358 B2 | 2/2009 | Kobayashi et al. |
| 7,508,382 B2 | 3/2009 | Denoue et al. |
| 7,561,142 B2 | 7/2009 | Shahoian et al. |
| 7,562,468 B2 | 7/2009 | Ellis |
| 7,569,086 B2 | 8/2009 | Chandran |
| 7,571,756 B2 | 8/2009 | Smith et al. |
| 7,575,368 B2 | 8/2009 | Guillaume |
| 7,586,220 B2 | 9/2009 | Roberts |
| 7,619,498 B2 | 11/2009 | Miura |
| 7,639,232 B2 | 12/2009 | Grant et al. |
| 7,641,618 B2 | 1/2010 | Noda et al. |
| 7,647,196 B2 | 1/2010 | Kahn et al. |
| 7,649,305 B2 | 1/2010 | Priya et al. |
| 7,675,253 B2 | 3/2010 | Dorel |
| 7,675,414 B2 | 3/2010 | Ray |
| 7,679,611 B2 | 3/2010 | Schena |
| 7,707,742 B2 | 5/2010 | Ellis |
| 7,710,399 B2 | 5/2010 | Bruneau et al. |
| 7,732,951 B2 | 6/2010 | Mukaide |
| 7,737,828 B2 | 6/2010 | Yang et al. |
| 7,742,036 B2 | 6/2010 | Grant et al. |
| 7,788,032 B2 | 8/2010 | Moloney |
| 7,793,429 B2 | 9/2010 | Ellis |
| 7,793,430 B2 | 9/2010 | Ellis |
| 7,798,982 B2 | 9/2010 | Zets et al. |
| 7,843,158 B2 | 11/2010 | Prisco |
| 7,868,489 B2 | 1/2011 | Amemiya et al. |
| 7,886,621 B2 | 2/2011 | Smith et al. |
| 7,888,892 B2 | 2/2011 | McReynolds et al. |
| 7,893,922 B2 | 2/2011 | Klinghult et al. |
| 7,919,945 B2 | 4/2011 | Houston et al. |
| 7,929,382 B2 | 4/2011 | Yamazaki |
| 7,946,483 B2 | 5/2011 | Miller et al. |
| 7,952,261 B2 | 5/2011 | Lipton et al. |
| 7,952,566 B2 | 5/2011 | Poupyrev et al. |
| 7,956,770 B2 | 6/2011 | Klinghult et al. |
| 7,961,909 B2 | 6/2011 | Mandella et al. |
| 8,018,105 B2 | 9/2011 | Erixon et al. |
| 8,031,172 B2 | 10/2011 | Kruse et al. |
| 8,044,940 B2 | 10/2011 | Narusawa |

(56) References Cited

U.S. PATENT DOCUMENTS

| | | | |
|---|---|---|---|
| 8,069,881 B1 | 12/2011 | Cunha |
| 8,072,418 B2 | 12/2011 | Crawford et al. |
| 8,077,145 B2 | 12/2011 | Rosenberg et al. |
| 8,081,156 B2 | 12/2011 | Ruettiger |
| 8,082,640 B2 | 12/2011 | Takeda |
| 8,084,968 B2 | 12/2011 | Murray et al. |
| 8,098,234 B2 | 1/2012 | Lacroix et al. |
| 8,123,660 B2 | 2/2012 | Kruse et al. |
| 8,125,453 B2 | 2/2012 | Shahoian et al. |
| 8,141,276 B2 | 3/2012 | Ellis |
| 8,156,809 B2 | 4/2012 | Tierling et al. |
| 8,169,401 B2 | 5/2012 | Hardwick |
| 8,174,344 B2 | 5/2012 | Yakima et al. |
| 8,174,372 B2 | 5/2012 | da Costa |
| 8,179,027 B2 | 5/2012 | Barta et al. |
| 8,179,202 B2 | 5/2012 | Cruz-Hernandez et al. |
| 8,188,623 B2 | 5/2012 | Park |
| 8,205,356 B2 | 6/2012 | Ellis |
| 8,210,942 B2 | 7/2012 | Shimabukuro et al. |
| 8,232,494 B2 | 7/2012 | Purcocks |
| 8,242,641 B2 | 8/2012 | Bae |
| 8,248,277 B2 | 8/2012 | Peterson et al. |
| 8,248,278 B2 | 8/2012 | Schlosser et al. |
| 8,253,686 B2 | 8/2012 | Kyung et al. |
| 8,255,004 B2 | 8/2012 | Huang et al. |
| 8,261,468 B2 | 9/2012 | Ellis |
| 8,264,465 B2 | 9/2012 | Grant et al. |
| 8,270,114 B2 | 9/2012 | Argumedo et al. |
| 8,270,148 B2 | 9/2012 | Griffith et al. |
| 8,279,052 B2 | 10/2012 | Heubel et al. |
| 8,288,899 B2 | 10/2012 | Park et al. |
| 8,291,614 B2 | 10/2012 | Ellis |
| 8,294,600 B2 | 10/2012 | Peterson et al. |
| 8,315,746 B2 | 11/2012 | Cox et al. |
| 8,339,250 B2 | 12/2012 | Je et al. |
| 8,344,834 B2 | 1/2013 | Niiyama |
| 8,345,013 B2 | 1/2013 | Heubel et al. |
| 8,373,549 B2 | 2/2013 | Fadell et al. |
| 8,378,797 B2 | 2/2013 | Pance et al. |
| 8,378,798 B2 | 2/2013 | Bells et al. |
| 8,378,965 B2 | 2/2013 | Gregorio et al. |
| 8,384,316 B2 | 2/2013 | Houston et al. |
| 8,384,679 B2 | 2/2013 | Paleczny et al. |
| 8,388,346 B2 | 3/2013 | Rantala et al. |
| 8,390,594 B2 | 3/2013 | Modarres et al. |
| 8,395,587 B2 | 3/2013 | Cauwels et al. |
| 8,398,570 B2 | 3/2013 | Mortimer et al. |
| 8,405,618 B2 | 3/2013 | Colgate et al. |
| 8,411,058 B2 | 4/2013 | Wong et al. |
| 8,446,264 B2 | 5/2013 | Tanase |
| 8,451,255 B2 | 5/2013 | Weber et al. |
| 8,452,345 B2 | 5/2013 | Lee et al. |
| 8,461,951 B2 | 6/2013 | Gassmann et al. |
| 8,466,889 B2 | 6/2013 | Tong et al. |
| 8,471,690 B2 | 6/2013 | Hennig et al. |
| 8,487,759 B2 | 7/2013 | Hill |
| 8,515,398 B2 | 8/2013 | Song et al. |
| 8,542,134 B2 | 9/2013 | Peterson et al. |
| 8,545,322 B2 | 10/2013 | George et al. |
| 8,547,341 B2 | 10/2013 | Takashima et al. |
| 8,547,350 B2 | 10/2013 | Anglin et al. |
| 8,552,859 B2 | 10/2013 | Pakula et al. |
| 8,570,291 B2 | 10/2013 | Motomura |
| 8,575,794 B2 | 11/2013 | Lee et al. |
| 8,576,171 B2 | 11/2013 | Grant |
| 8,587,955 B2 | 11/2013 | DiFonzo et al. |
| 8,593,409 B1 | 11/2013 | Heubel |
| 8,598,893 B2 | 12/2013 | Camus |
| 8,599,047 B2 | 12/2013 | Schlosser et al. |
| 8,599,152 B1 | 12/2013 | Wurtenberger et al. |
| 8,600,354 B2 | 12/2013 | Esaki |
| 8,614,431 B2 | 12/2013 | Huppi et al. |
| 8,621,348 B2 | 12/2013 | Ramsay et al. |
| 8,629,843 B2 | 1/2014 | Steeves et al. |
| 8,633,916 B2 | 1/2014 | Bernstein et al. |
| 8,674,941 B2 | 3/2014 | Casparian et al. |
| 8,680,723 B2 | 3/2014 | Subramanian |
| 8,681,092 B2 | 3/2014 | Harada et al. |
| 8,682,396 B2 | 3/2014 | Yang et al. |
| 8,686,952 B2 | 4/2014 | Burrough et al. |
| 8,710,966 B2 | 4/2014 | Hill |
| 8,717,309 B2 | 5/2014 | Almalki |
| 8,723,813 B2 | 5/2014 | Park et al. |
| 8,733,540 B2 | 5/2014 | Woiler et al. |
| 8,735,755 B2 | 5/2014 | Peterson et al. |
| 8,760,273 B2 | 6/2014 | Casparian et al. |
| 8,760,413 B2 | 6/2014 | Peterson et al. |
| 8,780,060 B2 | 7/2014 | Maschmeyer et al. |
| 8,787,006 B2 | 7/2014 | Golko et al. |
| 8,797,152 B2 | 8/2014 | Henderson et al. |
| 8,798,534 B2 | 8/2014 | Rodriguez et al. |
| 8,803,842 B2 | 8/2014 | Wakasugi et al. |
| 8,816,981 B2 | 8/2014 | Kai et al. |
| 8,836,502 B2 | 9/2014 | Culbert et al. |
| 8,857,248 B2 | 10/2014 | Shih et al. |
| 8,860,562 B2 | 10/2014 | Hill |
| 8,861,776 B2 | 10/2014 | Lastrucci |
| 8,866,600 B2 | 10/2014 | Yang et al. |
| 8,890,666 B2 | 11/2014 | Parker et al. |
| 8,890,668 B2 | 11/2014 | Pance et al. |
| 8,918,215 B2 | 12/2014 | Bosscher et al. |
| 8,928,621 B2 | 1/2015 | Ciesla et al. |
| 8,947,383 B2 | 2/2015 | Ciesla et al. |
| 8,948,821 B2 | 2/2015 | Newham et al. |
| 8,952,937 B2 | 2/2015 | Shih et al. |
| 8,970,534 B2 | 3/2015 | Adachi et al. |
| 8,976,141 B2 | 3/2015 | Myers et al. |
| 9,008,730 B2 | 4/2015 | Kim et al. |
| 9,012,795 B2 | 4/2015 | Niu |
| 9,013,426 B2 | 4/2015 | Cole et al. |
| 9,019,088 B2 | 4/2015 | Zawacki et al. |
| 9,024,738 B2 | 5/2015 | Van Schyndel et al. |
| 9,035,887 B1 | 5/2015 | Prud'Hommeaux et al. |
| 9,072,576 B2 | 7/2015 | Nishiura |
| 9,083,821 B2 | 7/2015 | Hughes |
| 9,092,129 B2 | 7/2015 | Abdo et al. |
| 9,098,984 B2 | 8/2015 | Heubel et al. |
| 9,098,991 B2 | 8/2015 | Park et al. |
| 9,117,347 B2 | 8/2015 | Matthews |
| 9,122,325 B2 | 9/2015 | Peshkin et al. |
| 9,131,039 B2 | 9/2015 | Behles |
| 9,134,834 B2 | 9/2015 | Reshef |
| 9,141,225 B2 | 9/2015 | Cok et al. |
| 9,158,379 B2 | 10/2015 | Cruz-Hernandez et al. |
| 9,178,509 B2 | 11/2015 | Bernstein |
| 9,189,932 B2 | 11/2015 | Kerdemelidis et al. |
| 9,201,458 B2 | 12/2015 | Hunt et al. |
| 9,202,355 B2 | 12/2015 | Hill |
| 9,219,401 B2 | 12/2015 | Kim et al. |
| 9,235,267 B2 | 1/2016 | Pope et al. |
| 9,274,601 B2 | 3/2016 | Faubert et al. |
| 9,274,602 B2 | 3/2016 | Garg et al. |
| 9,274,603 B2 | 3/2016 | Modarres et al. |
| 9,275,815 B2 | 3/2016 | Hoffmann |
| 9,285,923 B2 | 3/2016 | Liao et al. |
| 9,293,054 B2 | 3/2016 | Bruni et al. |
| 9,300,181 B2 | 3/2016 | Maeda et al. |
| 9,310,906 B2 | 4/2016 | Yumiki et al. |
| 9,310,950 B2 | 4/2016 | Takano et al. |
| 9,317,116 B2 | 4/2016 | Ullrich et al. |
| 9,317,118 B2 | 4/2016 | Puskarich |
| 9,317,154 B2 | 4/2016 | Perlin et al. |
| 9,318,942 B2 | 4/2016 | Sugita et al. |
| 9,325,230 B2 | 4/2016 | Yamada et al. |
| 9,330,544 B2 | 5/2016 | Levesque et al. |
| 9,357,052 B2 | 5/2016 | Ullrich |
| 9,360,944 B2 | 6/2016 | Pinault |
| 9,367,238 B2 | 6/2016 | Tanada |
| 9,380,145 B2 | 6/2016 | Tartz et al. |
| 9,390,599 B2 | 7/2016 | Weinberg |
| 9,396,434 B2 | 7/2016 | Rothkopf |
| 9,405,369 B2 | 8/2016 | Modarres et al. |
| 9,411,423 B2 | 8/2016 | Heubel |
| 9,417,695 B2 | 8/2016 | Griffin et al. |

(56) References Cited

U.S. PATENT DOCUMENTS

| | | |
|---|---|---|
| 9,430,042 B2 | 8/2016 | Levin |
| 9,448,628 B2 | 9/2016 | Tan et al. |
| 9,448,713 B2 | 9/2016 | Cruz-Hernandez et al. |
| 9,449,476 B2 | 9/2016 | Lynn |
| 9,452,268 B2 | 9/2016 | Badaye et al. |
| 9,454,239 B2 | 9/2016 | Elias et al. |
| 9,467,033 B2 | 10/2016 | Jun et al. |
| 9,468,846 B2 | 10/2016 | Terrell et al. |
| 9,471,172 B2 | 10/2016 | Sirois |
| 9,477,342 B2 | 10/2016 | Daverman et al. |
| 9,480,947 B2 | 11/2016 | Jiang et al. |
| 9,489,810 B2 | 11/2016 | Tissot |
| 9,501,912 B1 | 11/2016 | Havskjold et al. |
| 9,542,028 B2 | 1/2017 | Filiz et al. |
| 9,544,694 B2 | 1/2017 | Abe et al. |
| 9,564,029 B2 | 2/2017 | Morrell et al. |
| 9,576,445 B2 | 2/2017 | Cruz-Hernandez |
| 9,594,450 B2 | 3/2017 | Lynn et al. |
| 9,595,659 B2 | 3/2017 | Kim |
| 9,600,070 B2 | 3/2017 | Chatterjee et al. |
| 9,608,506 B2 | 3/2017 | Degner et al. |
| 9,622,214 B2 | 4/2017 | Ryu |
| 9,640,048 B2 | 5/2017 | Hill |
| 9,652,040 B2 | 5/2017 | Martinez et al. |
| 9,659,482 B2 | 5/2017 | Yang et al. |
| 9,665,198 B2 | 5/2017 | Kies et al. |
| 9,692,286 B2 | 6/2017 | Endo et al. |
| 9,696,803 B2 | 7/2017 | Curz-Hernandez et al. |
| 9,727,157 B2 | 8/2017 | Ham et al. |
| 9,733,704 B2 | 8/2017 | Cruz-Hernandez et al. |
| 9,746,945 B2 | 8/2017 | Sheynblat et al. |
| 9,778,743 B2 | 10/2017 | Grant et al. |
| 9,779,592 B1 | 10/2017 | Hoen |
| 9,781,984 B2 | 10/2017 | Baranski et al. |
| 9,785,251 B2 | 10/2017 | Martisauskas |
| 9,795,044 B2 | 10/2017 | Lai et al. |
| 9,823,833 B2 | 11/2017 | Grant et al. |
| 9,830,782 B2 | 11/2017 | Morrell et al. |
| 9,831,871 B2 * | 11/2017 | Lee .......................... G06F 3/044 |
| 9,836,123 B2 | 12/2017 | Gipson et al. |
| 9,836,270 B2 * | 12/2017 | Yliaho ..................... H04R 3/12 |
| 9,846,484 B2 | 12/2017 | Shah |
| 9,857,872 B2 | 1/2018 | Terlizzi et al. |
| 9,870,053 B2 | 1/2018 | Modarres et al. |
| 9,886,093 B2 | 2/2018 | Moussette et al. |
| 9,891,708 B2 | 2/2018 | Cruz-Hernandez et al. |
| 9,904,393 B2 | 2/2018 | Frey et al. |
| 9,911,553 B2 | 3/2018 | Bernstein |
| 9,928,950 B2 | 3/2018 | Lubinski et al. |
| 9,934,661 B2 | 4/2018 | Hill |
| 9,970,757 B2 | 5/2018 | Das et al. |
| 9,990,099 B2 | 6/2018 | Ham et al. |
| 9,997,306 B2 | 6/2018 | Bernstein |
| 10,013,058 B2 | 7/2018 | Puskarich et al. |
| 10,032,550 B1 | 7/2018 | Zhang |
| 10,038,361 B2 | 7/2018 | Hajati et al. |
| 10,039,080 B2 | 7/2018 | Miller et al. |
| 10,061,386 B2 | 8/2018 | Frescas et al. |
| 10,062,832 B2 | 8/2018 | Caraveo et al. |
| 10,067,585 B2 | 9/2018 | Kim |
| 10,069,392 B2 | 9/2018 | Degner et al. |
| 10,108,151 B2 | 10/2018 | Cardinali et al. |
| 10,108,265 B2 | 10/2018 | Harley et al. |
| 10,120,446 B2 | 11/2018 | Pance et al. |
| 10,126,817 B2 | 11/2018 | Morrell et al. |
| 10,127,778 B2 | 11/2018 | Hajati et al. |
| 10,133,352 B2 | 11/2018 | Lee et al. |
| 10,139,907 B2 | 11/2018 | Billington |
| 10,139,959 B2 | 11/2018 | Butler et al. |
| 10,152,116 B2 | 12/2018 | Wang et al. |
| 10,198,097 B2 | 2/2019 | Lynn et al. |
| 10,204,494 B2 | 2/2019 | Do et al. |
| 10,236,760 B2 | 3/2019 | Moussette et al. |
| 10,268,272 B2 | 4/2019 | Chen |
| 10,276,001 B2 | 4/2019 | Smith et al. |
| 10,289,199 B2 | 5/2019 | Hoellwarth et al. |
| 10,338,682 B2 | 7/2019 | Heubel et al. |
| 10,345,905 B2 | 7/2019 | McClure et al. |
| 10,353,382 B2 | 7/2019 | Bodenstein |
| 10,353,467 B2 | 7/2019 | Augenbergs et al. |
| 10,367,950 B2 | 7/2019 | Davis et al. |
| 10,372,250 B2 | 8/2019 | Zhang et al. |
| 10,416,811 B2 | 9/2019 | Abdollahian et al. |
| 10,423,214 B2 | 9/2019 | Mistry et al. |
| 10,429,929 B2 | 10/2019 | Sulem et al. |
| 10,436,607 B2 | 10/2019 | Chen et al. |
| 10,444,834 B2 | 10/2019 | Vescovi |
| 10,444,841 B2 | 10/2019 | Nakamura et al. |
| 10,456,622 B2 | 10/2019 | Szabados et al. |
| 10,459,521 B2 | 10/2019 | Puskarich |
| 10,475,300 B2 | 11/2019 | Hill |
| 10,481,691 B2 | 11/2019 | Utterman et al. |
| 10,481,692 B2 | 11/2019 | Ullrich et al. |
| 10,488,927 B2 | 11/2019 | Lim et al. |
| 10,490,035 B2 | 11/2019 | Morrell et al. |
| 10,503,255 B2 | 12/2019 | Ramstein et al. |
| 10,504,339 B2 | 12/2019 | Birnbaum et al. |
| 10,514,761 B2 | 12/2019 | Rihn |
| 10,540,043 B2 | 1/2020 | Tanemura et al. |
| 10,545,604 B2 | 1/2020 | Bijamov et al. |
| 10,564,721 B2 | 2/2020 | Curz-Hernandez et al. |
| 10,566,888 B2 | 2/2020 | Degner et al. |
| 10,585,480 B1 | 3/2020 | Bushnell |
| 10,608,162 B2 | 3/2020 | Noguchi |
| 10,609,677 B2 | 3/2020 | Miller et al. |
| 10,622,538 B2 | 4/2020 | Zhang et al. |
| 10,651,716 B2 | 5/2020 | Moussette et al. |
| 10,691,211 B2 | 6/2020 | Amin-Shahidi et al. |
| 10,762,752 B1 | 9/2020 | Persson |
| 10,788,932 B2 | 9/2020 | Iuchi et al. |
| 10,809,805 B2 | 10/2020 | Chen |
| 10,840,739 B2 | 11/2020 | Slabaugh et al. |
| 10,890,973 B2 | 1/2021 | Hajati |
| 10,890,978 B2 | 1/2021 | Bushnell et al. |
| 10,942,571 B2 | 3/2021 | Hendren et al. |
| 10,973,285 B2 | 4/2021 | Lukens et al. |
| 10,983,600 B2 | 4/2021 | Wang et al. |
| 11,043,088 B2 | 6/2021 | Hill |
| 11,165,141 B2 | 11/2021 | Hsu et al. |
| 11,165,382 B2 | 11/2021 | Creary et al. |
| 11,245,949 B2 | 2/2022 | Ekanayake et al. |
| 11,380,470 B2 | 7/2022 | Amin-Shahidi et al. |
| 11,402,911 B2 | 8/2022 | Uttermann et al. |
| 11,605,273 B2 | 3/2023 | Hill |
| 11,724,285 B2 | 8/2023 | Chauvette |
| 2002/0194284 A1 | 12/2002 | Haynes |
| 2003/0210259 A1 | 11/2003 | Liu |
| 2004/0021663 A1 | 2/2004 | Suzuki et al. |
| 2004/0127198 A1 | 7/2004 | Roskind et al. |
| 2005/0057528 A1 | 3/2005 | Kleen |
| 2005/0107129 A1 | 5/2005 | Kaewell et al. |
| 2005/0110778 A1 | 5/2005 | Ben Ayed |
| 2005/0118922 A1 | 6/2005 | Endo |
| 2005/0217142 A1 | 10/2005 | Ellis |
| 2005/0237306 A1 | 10/2005 | Klein et al. |
| 2005/0248549 A1 | 11/2005 | Dietz et al. |
| 2005/0258715 A1 | 11/2005 | Schlabach |
| 2006/0014569 A1 | 1/2006 | DelGiorno |
| 2006/0154674 A1 | 7/2006 | Landschaft et al. |
| 2006/0209037 A1 | 9/2006 | Wang et al. |
| 2006/0239746 A1 | 10/2006 | Grant |
| 2006/0252463 A1 | 11/2006 | Liao |
| 2007/0032270 A1 | 2/2007 | Orr |
| 2007/0043725 A1 | 2/2007 | Hotelling et al. |
| 2007/0099574 A1 | 5/2007 | Wang |
| 2007/0152974 A1 | 7/2007 | Kim et al. |
| 2007/0168430 A1 | 7/2007 | Brun et al. |
| 2007/0178942 A1 | 8/2007 | Sadler et al. |
| 2007/0188450 A1 | 8/2007 | Hernandez et al. |
| 2008/0084384 A1 | 4/2008 | Gregorio et al. |
| 2008/0165148 A1 | 7/2008 | Williamson |
| 2008/0181501 A1 | 7/2008 | Faraboschi |
| 2008/0181706 A1 | 7/2008 | Jackson |
| 2008/0192014 A1 | 8/2008 | Kent et al. |

(56) References Cited

U.S. PATENT DOCUMENTS

| | | |
|---|---|---|
| 2008/0204428 A1 | 8/2008 | Pierce et al. |
| 2008/0255794 A1 | 10/2008 | Levine |
| 2009/0002328 A1 | 1/2009 | Ullrich et al. |
| 2009/0015560 A1 | 1/2009 | Robinson et al. |
| 2009/0115734 A1 | 5/2009 | Fredriksson et al. |
| 2009/0120105 A1 | 5/2009 | Ramsay et al. |
| 2009/0128503 A1 | 5/2009 | Grant et al. |
| 2009/0135142 A1 | 5/2009 | Fu et al. |
| 2009/0167702 A1 | 7/2009 | Nurmi |
| 2009/0218148 A1 | 9/2009 | Hugeback et al. |
| 2009/0225046 A1 | 9/2009 | Kim et al. |
| 2009/0236210 A1 | 9/2009 | Clark et al. |
| 2009/0259090 A1 | 10/2009 | Parker |
| 2009/0267892 A1 | 10/2009 | Faubert |
| 2009/0291670 A1 | 11/2009 | Sennett et al. |
| 2010/0020036 A1 | 1/2010 | Hui et al. |
| 2010/0053087 A1 | 3/2010 | Dai et al. |
| 2010/0089735 A1 | 4/2010 | Takeda et al. |
| 2010/0110018 A1 | 5/2010 | Faubert et al. |
| 2010/0141408 A1 | 6/2010 | Doy et al. |
| 2010/0141606 A1 | 6/2010 | Bae et al. |
| 2010/0148944 A1 | 6/2010 | Kim et al. |
| 2010/0152620 A1 | 6/2010 | Ramsay et al. |
| 2010/0164894 A1 | 7/2010 | Kim et al. |
| 2010/0188422 A1 | 7/2010 | Shingai et al. |
| 2010/0265197 A1 | 10/2010 | Purdy |
| 2010/0309141 A1* | 12/2010 | Cruz-Hernandez ..... G06F 3/016 |
| | | 345/173 |
| 2010/0328229 A1 | 12/2010 | Weber et al. |
| 2011/0007023 A1 | 1/2011 | Abrahamsson et al. |
| 2011/0053577 A1 | 3/2011 | Lee et al. |
| 2011/0107958 A1 | 5/2011 | Pance et al. |
| 2011/0121765 A1 | 5/2011 | Anderson et al. |
| 2011/0128239 A1 | 6/2011 | Polyakov et al. |
| 2011/0148608 A1 | 6/2011 | Grant et al. |
| 2011/0156539 A1 | 6/2011 | Park et al. |
| 2011/0157052 A1 | 6/2011 | Lee et al. |
| 2011/0163985 A1 | 7/2011 | Bae et al. |
| 2011/0216013 A1 | 9/2011 | Siotis |
| 2011/0248948 A1 | 10/2011 | Griffin et al. |
| 2011/0260988 A1 | 10/2011 | Colgate et al. |
| 2011/0263200 A1 | 10/2011 | Thornton et al. |
| 2011/0291950 A1 | 12/2011 | Tong |
| 2011/0304559 A1 | 12/2011 | Pasquero |
| 2012/0092263 A1 | 4/2012 | Peterson et al. |
| 2012/0126959 A1 | 5/2012 | Zarrabi et al. |
| 2012/0133494 A1 | 5/2012 | Cruz-Hernandez et al. |
| 2012/0206248 A1 | 8/2012 | Biggs |
| 2012/0256848 A1 | 10/2012 | Madabusi Srinivasan |
| 2012/0274578 A1 | 11/2012 | Snow et al. |
| 2012/0280927 A1 | 11/2012 | Ludwig |
| 2012/0319987 A1 | 12/2012 | Woo |
| 2012/0327006 A1 | 12/2012 | Israr et al. |
| 2013/0027345 A1 | 1/2013 | Binzel |
| 2013/0033967 A1 | 2/2013 | Chuang et al. |
| 2013/0043987 A1 | 2/2013 | Kasama et al. |
| 2013/0058816 A1 | 3/2013 | Kim |
| 2013/0106699 A1 | 5/2013 | Babatunde |
| 2013/0191741 A1 | 7/2013 | Dickinson et al. |
| 2013/0200732 A1* | 8/2013 | Jun ....................... H02K 33/16 |
| | | 310/25 |
| 2013/0207793 A1 | 8/2013 | Weaber et al. |
| 2013/0217491 A1 | 8/2013 | Hilbert et al. |
| 2013/0261811 A1 | 10/2013 | Yagi et al. |
| 2013/0300590 A1 | 11/2013 | Dietz et al. |
| 2014/0082490 A1 | 3/2014 | Jung et al. |
| 2014/0085065 A1 | 3/2014 | Biggs et al. |
| 2014/0132528 A1 | 5/2014 | Catton |
| 2014/0168153 A1 | 6/2014 | Deichmann et al. |
| 2014/0197936 A1 | 7/2014 | Biggs et al. |
| 2014/0267076 A1 | 9/2014 | Birnbaum et al. |
| 2015/0005039 A1 | 1/2015 | Liu et al. |
| 2015/0040005 A1 | 2/2015 | Faaborg |
| 2015/0098309 A1 | 4/2015 | Adams et al. |
| 2015/0169059 A1 | 6/2015 | Behles et al. |
| 2015/0194165 A1 | 7/2015 | Faaborg et al. |
| 2015/0205355 A1 | 7/2015 | Yairi |
| 2015/0205417 A1 | 7/2015 | Yairi et al. |
| 2015/0296480 A1 | 10/2015 | Kinsey et al. |
| 2016/0103544 A1 | 4/2016 | Filiz et al. |
| 2016/0179260 A1* | 6/2016 | Ham .................... G06F 3/0412 |
| | | 345/173 |
| 2016/0241119 A1 | 8/2016 | Keeler |
| 2017/0153703 A1 | 6/2017 | Yun et al. |
| 2017/0311282 A1 | 10/2017 | Miller et al. |
| 2017/0357325 A1 | 12/2017 | Yang et al. |
| 2017/0364158 A1 | 12/2017 | Wen et al. |
| 2018/0060941 A1 | 3/2018 | Yang et al. |
| 2018/0081441 A1 | 3/2018 | Pedder et al. |
| 2018/0090253 A1 | 3/2018 | Songatikamas et al. |
| 2018/0302881 A1 | 10/2018 | Miller et al. |
| 2019/0204606 A1 | 7/2019 | Yang et al. |
| 2021/0099062 A1* | 4/2021 | Tarelli ................... H02P 25/032 |
| 2022/0291746 A1 | 9/2022 | Tarelli et al. |
| 2022/0336132 A1 | 10/2022 | Amin-Shahidi et al. |
| 2023/0094873 A1 | 3/2023 | Chen et al. |
| 2023/0215250 A1 | 7/2023 | Hill |

FOREIGN PATENT DOCUMENTS

| | | |
|---|---|---|
| CA | 2355434 | 2/2002 |
| CN | 1324030 | 11/2001 |
| CN | 1692371 | 11/2005 |
| CN | 1817321 | 8/2006 |
| CN | 101120290 | 2/2008 |
| CN | 101409164 | 4/2009 |
| CN | 101763192 | 6/2010 |
| CN | 101903848 | 12/2010 |
| CN | 101938207 | 1/2011 |
| CN | 102025257 | 4/2011 |
| CN | 102057656 | 5/2011 |
| CN | 201829004 | 5/2011 |
| CN | 102163076 | 8/2011 |
| CN | 102246122 | 11/2011 |
| CN | 102315747 | 1/2012 |
| CN | 102591512 | 7/2012 |
| CN | 102667681 | 9/2012 |
| CN | 102713805 | 10/2012 |
| CN | 102754054 | 10/2012 |
| CN | 102768593 | 11/2012 |
| CN | 102844972 | 12/2012 |
| CN | 102915111 | 2/2013 |
| CN | 103019569 | 4/2013 |
| CN | 103154867 | 6/2013 |
| CN | 103155410 | 6/2013 |
| CN | 103181090 | 6/2013 |
| CN | 103218104 | 7/2013 |
| CN | 103278173 | 9/2013 |
| CN | 103416043 | 11/2013 |
| CN | 103440076 | 12/2013 |
| CN | 103567135 | 2/2014 |
| CN | 103970339 | 8/2014 |
| CN | 104049746 | 9/2014 |
| CN | 104220963 | 12/2014 |
| CN | 104917885 | 9/2015 |
| CN | 104956244 | 9/2015 |
| CN | 105556268 | 5/2016 |
| CN | 208013890 | 10/2018 |
| DE | 19517630 | 11/1996 |
| DE | 10330024 | 1/2005 |
| DE | 102008027720 | 12/2009 |
| DE | 102009038103 | 2/2011 |
| DE | 102011115762 | 4/2013 |
| EP | 0483955 | 5/1992 |
| EP | 1047258 | 10/2000 |
| EP | 1686776 | 8/2006 |
| EP | 2060967 | 5/2009 |
| EP | 2073099 | 6/2009 |
| EP | 2194444 | 6/2010 |
| EP | 2207080 | 7/2010 |
| EP | 2264562 A2 | 12/2010 |
| EP | 2315186 | 4/2011 |
| EP | 2374430 | 10/2011 |
| EP | 2395414 | 12/2011 |

(56) References Cited

FOREIGN PATENT DOCUMENTS

| EP | 2461228 | 6/2012 |
|---|---|---|
| EP | 2631746 | 8/2013 |
| EP | 2434555 | 10/2013 |
| EP | 2148339 | 7/2015 |
| JP | H05301342 A2 | 11/1993 |
| JP | 2001095290 | 4/2001 |
| JP | 2002199689 | 7/2002 |
| JP | 2002102799 | 9/2002 |
| JP | 200362525 | 3/2003 |
| JP | 2003117489 | 4/2003 |
| JP | 2003527046 | 9/2003 |
| JP | 200494389 | 3/2004 |
| JP | 2004236202 | 8/2004 |
| JP | 2006150865 | 6/2006 |
| JP | 3831410 | 10/2006 |
| JP | 2007519099 | 7/2007 |
| JP | 200818928 | 1/2008 |
| JP | 2010536040 | 11/2010 |
| JP | 2010272903 | 12/2010 |
| JP | 2011523840 | 8/2011 |
| JP | 2012135755 | 7/2012 |
| JP | 2013149124 | 8/2013 |
| JP | 2014002729 | 1/2014 |
| JP | 2014509028 | 4/2014 |
| JP | 2014235133 | 12/2014 |
| JP | 2014239323 | 12/2014 |
| JP | 2015153406 | 8/2015 |
| JP | 2015228214 | 12/2015 |
| JP | 2016095552 | 5/2016 |
| KR | 20050033909 | 4/2005 |
| KR | 1020100046602 | 5/2010 |
| KR | 1020110101516 | 9/2011 |
| KR | 20130024420 | 3/2013 |
| KR | 101275286 | 6/2013 |
| TW | 200518000 | 11/2007 |
| TW | 200951944 | 12/2009 |
| TW | 201145336 | 12/2011 |
| TW | 201218039 | 5/2012 |
| TW | 201425180 | 7/2014 |
| WO | WO 97/016932 | 5/1997 |
| WO | WO 00/051190 | 8/2000 |
| WO | WO 01/059558 | 8/2001 |
| WO | WO 01/089003 | 11/2001 |
| WO | WO 02/073587 | 9/2002 |
| WO | WO 03/038800 | 5/2003 |
| WO | WO 03/100550 | 12/2003 |
| WO | WO 06/057770 | 6/2006 |
| WO | WO 07/114631 | 10/2007 |
| WO | WO 08/075082 | 6/2008 |
| WO | WO 09/038862 | 3/2009 |
| WO | WO 09/068986 | 6/2009 |
| WO | WO 09/097866 | 8/2009 |
| WO | WO 09/122331 | 10/2009 |
| WO | WO 09/150287 | 12/2009 |
| WO | WO 10/085575 | 7/2010 |
| WO | WO 10/087925 | 8/2010 |
| WO | WO 11/007263 | 1/2011 |
| WO | WO 12/052635 | 4/2012 |
| WO | WO 12/129247 | 9/2012 |
| WO | WO 13/069148 | 5/2013 |
| WO | WO 13/150667 | 10/2013 |
| WO | WO 13/169299 | 11/2013 |
| WO | WO 13/169302 | 11/2013 |
| WO | WO 13/173838 | 11/2013 |
| WO | WO 13/186846 | 12/2013 |
| WO | WO 13/186847 | 12/2013 |
| WO | WO 14/018086 | 1/2014 |
| WO | WO 14/098077 | 6/2014 |
| WO | WO 15/023670 | 2/2015 |
| WO | WO 16/141482 | 9/2016 |
| WO | WO 17/027792 | 2/2017 |

OTHER PUBLICATIONS

Astronomer's Toolbox, "The Electromagnetic Spectrum," http://imagine.gsfc.nasa.gov/science/toolbox/emspectrum1.html, updated Mar. 2013, 4 pages.

Hasser et al., "Preliminary Evaluation of a Shape-Memory Alloy Tactile Feedback Display," Advances in Robotics, Mechantronics, and Haptic Interfaces, ASME, DSC—vol. 49, pp. 73-80, 1993.

Hill et al., "Real-time Estimation of Human Impedance for Haptic Interfaces," Stanford Telerobotics Laboratory, Department of Mechanical Engineering, Stanford University, Third Joint Eurohaptics Conference and Symposium on Haptic Interfaces for Virtual Environment and Teleoperator Systems, Salt Lake City, Utah, Mar. 18-20, 2009, pp. 440-445.

Kim et al., "Tactile Rendering of 3D Features on Touch Surfaces," UIST '13, Oct. 8-11, 2013, St. Andrews, United Kingdom, 8 pages.

Lee et al, "Haptic Pen: Tactile Feedback Stylus for Touch Screens," Mitsubishi Electric Research Laboratories, http://wwwlmerl.com, 6 pages, Oct. 2004.

Nakamura, "A Torso Haptic Display Based on Shape Memory Alloy Actuators," Massachusetts Institute of Technology, 2003, pp. 1-123.

PuntoCellulare, "LG-GD910.3G Watch Phone," YouTube (http://www.youtube.com/watch?v+HcCI87KIELM), Jan. 8, 2009, 9 pages.

Sullivan, Mark, "This Android Wear Update Turns Your Device into the Dick Tracy Watch," Fast Company (https://www.fastcompany.com/3056319/this-android-wear-update-turns-your-device-into-the-dick-tracy-watch), Feb. 4, 2016, 9 pages.

U.S. Appl. No. 18/120,850, filed Mar. 13, 2023, Hill et al.

* cited by examiner

100

120

118

102

106

108

GAP SENSING VIA ENGINE COIL

CROSS-REFERENCE TO RELATED APPLICATION

This application is a nonprovisional and claims the benefit under 35 U.S.C. 119(e) of U.S. Provisional Patent Application No. 63/409,746, filed Sep. 24, 2022, the contents of which are incorporated herein by reference as if fully disclosed herein.

FIELD

Embodiments described herein generally relate to electronic devices. More particularly, the described embodiments relate to electronic devices having an input mechanism that may be used to receive user input and generate haptic output (e.g., by a haptic engine and in response to the received user input).

BACKGROUND

A device such as a smartphone, tablet computer, or electronic watch may include a button that is usable to provide input to the device. In some cases, the button may be a volume button. In some cases, the button may be context-sensitive, and may be configured to receive different types of input based on an active context (e.g., an active utility or application) running on the device. Such a button may be located along a sidewall of a device, and may move toward the sidewall when a user presses the button. Pressing the button with an applied force that exceeds a threshold may trigger actuation (e.g., a state change) of a mechanical switch or an operation associated with the button. Alternatively, the button may be generally immovable, but may flex enough to provide a detectable input.

SUMMARY

Embodiments of the systems, devices, methods, and apparatus described in the present disclosure are directed to a button for which gap sensing is provided. A change in a gap may be caused by a force applied to the button. The size of the gap may need to be estimated so that an appropriate haptic output may be provided to a user via the button. For example, appropriate drive signals may need to be applied to a haptic engine associated with the button, to generate a consistent haptic output regardless of the determined gap size. In some embodiments, the haptic engine may be a permanent magnet biased electromagnetic haptic engine (or a permanent magnet biased normal flux electromagnetic haptic engine). In some embodiments, a button may be associated with a force sensor (or tactile switch) that triggers operation of the haptic engine in response to detecting a force (or press) on the button.

In some embodiments, an electronic device may comprise a plurality of housing elements, an input structure at least partially moveable with respect to at least one housing element of the plurality of housing elements, a coil assembly mechanically coupled to the input structure such that movement of the input structure causes movement of the coil assembly, and a stator having a surface that is separated by a gap from a surface of the coil assembly. The electronic device may further comprise a circuit operatively coupled to a processor, and the circuit and the processor may be configured to drive a first signal through the coil assembly and determine a distance of the gap based at least in part on an impedance of the coil assembly when driving the first signal through the coil assembly.

In some embodiments, a device may comprise a housing defining an opening, a button positioned at least partially within the opening and moveable with respect to the housing, a coil assembly comprising a casing and a coil disposed therein, a stator securely connected within the housing, and a flexible printed circuit board disposed within the housing. In some instances, the coil assembly is mechanically coupled to the button such that movement of the button causes movement of the coil assembly. In some instances, a surface of the stator is separated from a surface of the casing forming a gap therebetween. In some instances, one or more force sensors mechanically coupled to one or both of the button or the coil assembly. In some instances, one or more first wires connect the flexible printed circuit board to the coil. In some instances, one or more second wires connect the flexible printed circuit board to the one or more force sensors.

In some embodiments, a method of sensing a gap via a reluctance engine coil for controlling haptic output may comprise switching a circuit from a haptic drive mode to an inductive sensing mode, applying, via the circuit in the inductive sensing mode, a first signal to the reluctance engine coil, measuring, via the circuit in the inductive sensing mode, a complex impedance of the reluctance engine coil based at least in part on the first signal, determining, via the circuit in the inductive sensing mode, a distance of the gap associated with the reluctance engine coil and a stator based at least in part on the measured inductance and the measured resistance, and switching the circuit from the inductive sensing mode to the haptic drive mode.

In addition to the example aspects and embodiments described herein, further aspects and embodiments will become apparent by reference to the drawings and by study of the following description.

BRIEF DESCRIPTION OF THE DRAWINGS

The disclosure will be readily understood by the following detailed description in conjunction with the accompanying drawings, wherein like reference numerals designate like structural elements, and in which.

Figure 1A:
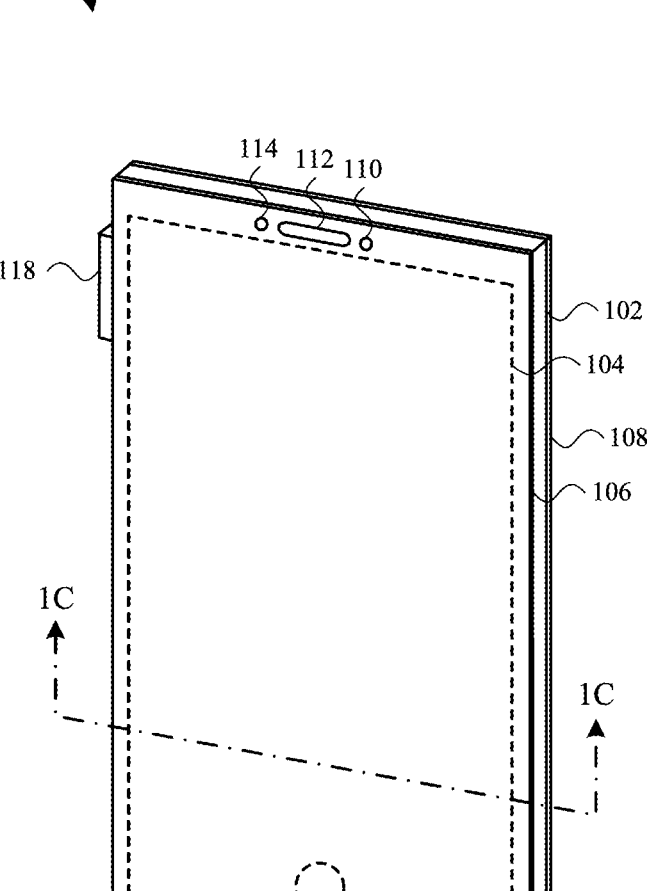
FIGS. 1A-1C show an example of an electronic device.

It should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

Additionally, the use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

DETAILED DESCRIPTION

Reference will now be made in detail to representative embodiments illustrated in the accompanying drawings. It should be understood that the following description is not intended to limit the embodiments to one preferred embodiment. To the contrary, it is intended to cover alternatives, modifications, and equivalents as can be included within the spirit and scope of the described embodiments as defined by the appended claims.

Described herein are techniques that enable sensing a gap distance (or gap size) between a moveable assembly and a stator. Embodiments may include a button to provide force sensing and/or haptic output functionality. In some embodiments, a button may be associated with a gap sensing operation using a reluctance engine coil that triggers operation of a haptic engine in response to detecting a force on the button. In some embodiments, a button may be associated with a gap sensing operation using a reluctance engine coil in combination with a force sensor that triggers operation of a haptic engine in response to detecting a force on the button. In some embodiments, the haptic engine may be a permanent magnet biased electromagnetic haptic engine (or a permanent magnet biased normal flux electromagnetic haptic engine). In some embodiments, the haptic engine may include a rotor or shuttle that is biased by one or more permanent magnets, and electromagnetically actuated. In some embodiments, the haptic engine may be a reluctance machine formed by an electromagnet positioned against or magnetically coupled to a ferritic body.

These and other embodiments are described with reference to FIGS. 1A-11. However, those skilled in the art will readily appreciate that the detailed description given herein with respect to these figures is for explanatory purposes only and should not be construed as limiting.

Directional terminology, such as "top", "bottom", "upper", "lower", "front", "back", "over", "under", "above", "below", "left", "right", etc. is used with reference to the orientation of some of the components in some of the figures described below. Because components in various embodiments can be positioned in a number of different orientations, directional terminology is used for purposes of illustration only and is in no way limiting. The directional terminology is intended to be construed broadly, and therefore should not be interpreted to preclude components being oriented in different ways. The use of alternative terminology, such as "or", is intended to indicate different combinations of the alternative elements. For example, A or B is intended to include, A, or B, or A and B. Additionally, motional terminology, such as "movable", "stationary" (e.g., stator), "closing", etc. should be understood as relative motion. In certain embodiments, for example, a "movable" body can be fixed relative to the electronic device and the "stator" body becomes the part that moves relative to the electronic device.

Figure 1B:
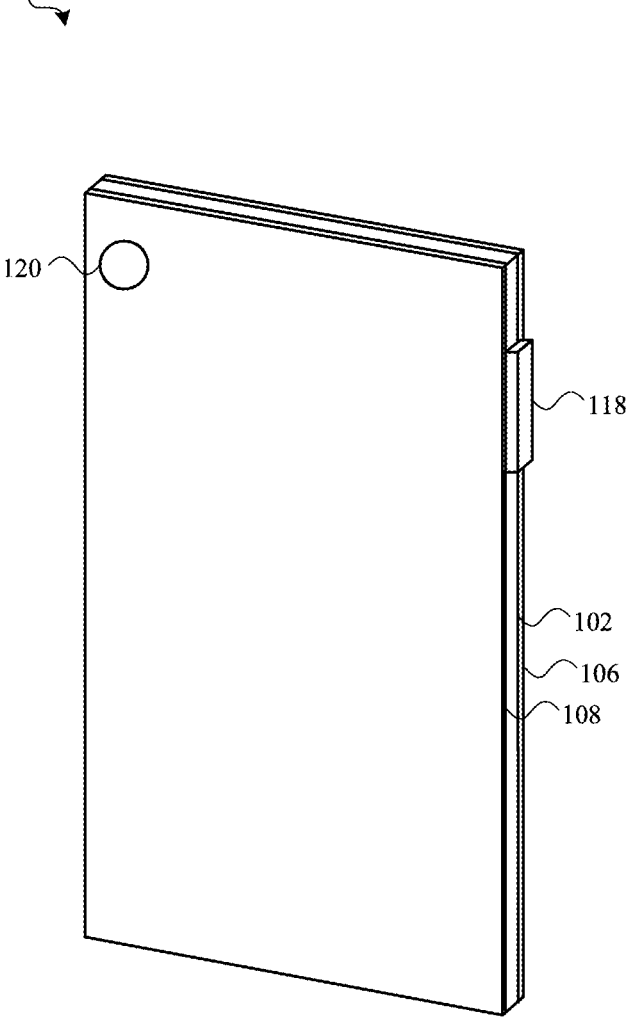
Figure 1C:
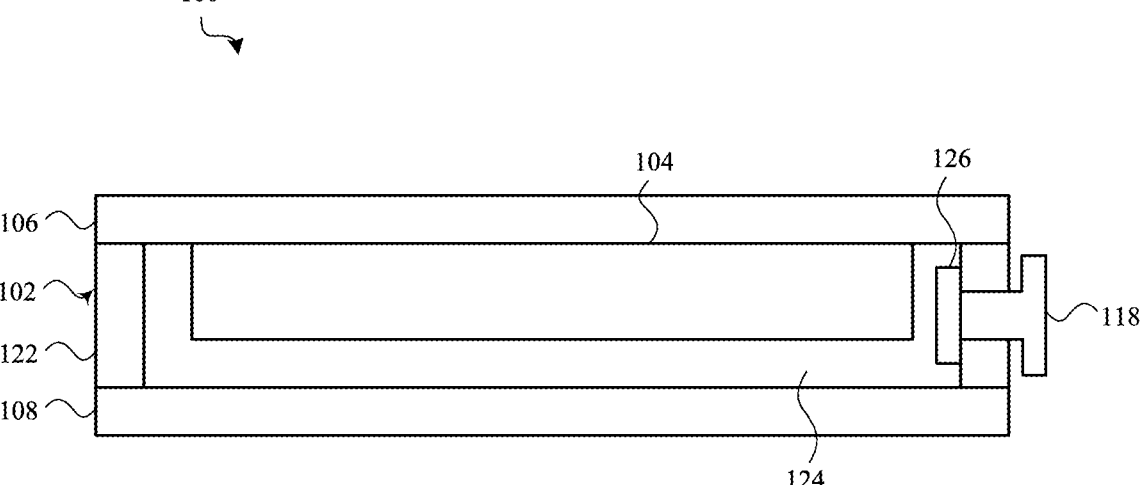

FIGS. 1A-1C show an example of an electronic device or simply referred to as device 100. The dimensions and form factor of device 100, including the ratio of the length of its long sides to the length of its short sides, suggest that the device 100 is a mobile phone (e.g., a smartphone). However, it is to be understood that the dimensions and form factor are arbitrarily chosen, and device 100 could alternatively be any portable electronic device including, for example, a mobile phone, tablet computer, portable computer, portable music player, health monitor device, portable terminal, or other portable or mobile device. FIG. 1A shows a front isometric view of the device 100; FIG. 1B shows a rear isometric view of the device 100; and FIG. 1C shows a cross-section of the device 100 taken along line 1C-1C. The device 100 may include a housing 102 that at least partially surrounds a display 104. The housing 102 may include or support a front cover 106 or a rear cover 108. The front cover 106 may be positioned over the display 104, and may provide a window through which the display 104 may be viewed. In some embodiments, the display 104 may be attached to (or abut) the housing 102 and/or the front cover 106.

As shown in FIGS. 1A and 1B, the device 100 may include various other components. For example, the front of the device 100 may include one or more front-facing cameras 110, speakers 112, microphones, or other components 114 (e.g., audio, imaging, or sensing components) that are configured to transmit or receive signals to/from the device 100. In some cases, a front-facing camera 110, alone or in combination with other sensors, may be configured to operate as a bio-authentication or facial recognition sensor. The device 100 may also include various input devices, including a mechanical or virtual button 116, which may be located along the front surface of the device 100. The device 100 may also include buttons or other input devices positioned along a sidewall of the housing 102 and/or on rear surface of the device 100. For example, a volume button or multipurpose button 118 may be positioned along the sidewall of the housing 102, and in some cases may extend through an aperture in the sidewall. By way of example, the rear surface of the device 100 is shown to include a rear-facing camera 120 or other optical sensor (see FIG. 1B). A flash or light source may also be positioned along the rear of the device 100 (e.g., near the rear-facing camera 120). In some cases, the rear surface of the device may include multiple rear-facing cameras.

The device 100 may include a display 104 that is at least partially surrounded by the housing 102. The display 104 may include one or more display elements including, for example, a light-emitting display (LED), organic light-emitting display (OLED), liquid crystal display (LCD), electroluminescent display (EL), or other type of display element. The display 104 may also include one or more touch and/or force sensors that are configured to detect a touch and/or a force applied to a surface of the front cover 106. The touch sensor may include a capacitive array of nodes or elements that are configured to detect a location of a touch on the surface of the front cover 106. A force sensor may include a capacitive array and/or strain sensor that is configured to detect an amount of force applied to the surface of the front cover 106.

FIG. 1C depicts a cross-section of the device 100 shown in FIGS. 1A and 1B. As shown in FIG. 1C, the rear cover 108 may be a discrete or separate component that is attached to the sidewall 122. In other cases, the rear cover 108 may be integrally formed with part or all of the sidewall 122.

As shown in FIG. 1C, the sidewall 122 or housing 102 may define an interior volume 124 in which various electronic components of the device 100, including the display 104, may be positioned. In this example, the display 104 is at least partially positioned within the interior volume 124 and attached to an inner surface of the front cover 106. A touch sensor, force sensor, or other sensing element may be integrated with the front cover 106 and/or the display 104 and may be configured to detect a touch and/or force applied to an outer surface of the front cover 106. In some cases, the touch sensor, force sensor, and/or other sensing element may be positioned between the front cover 106 and the display 104.

The touch sensor and/or force sensor may include an array of electrodes that are configured to detect a location and/or force of a touch using a capacitive, resistive, strain-based, or other sensing configuration. The touch sensor may include, for example, a set of capacitive touch sensing elements, a set of resistive touch sensing elements, or a set of ultrasonic touch sensing elements. When a user of the device touches the front cover 106, the touch sensor (or touch sensing system) may detect one or more touches on the front cover 106 and determine locations of the touches on the front cover 106. The touches may include, for example, touches by a user's finger or stylus. A force sensor or force sensing system may include, for example, a set of capacitive force sensing elements, a set of resistive force sensing elements, or one or more pressure transducers. When a user of the device 100 presses on the front cover 106 (e.g., applies a force to the front cover 106), the force sensing system may determine an amount of force applied to the front cover 106. In some embodiments, the force sensor (or force sensing system) may be used alone or in combination with the touch sensor (or touch sensing system) to determine a location of an applied force, or an amount of force associated with each touch in a set of multiple contemporaneous touches.

FIG. 1C further shows the multipurpose button 118 along the sidewall 122 The button may be accessible to a user of the device 100 and extend outward from the sidewall 122. In some cases, a portion of the button 118 may be positioned within a recess in the sidewall 122. Alternatively, the entire button 118 may be positioned within a recess in the sidewall 122, and the button 118 may be flush with the housing or inset into the housing.

The button 118 may extend through the housing and attach to a moveable assembly 126 of a haptic engine (not shown) and be coupled with a force sensor (not shown). By way of example, the haptic engine may include a permanent magnet biased electromagnetic haptic engine, or a permanent magnet normal flux electromagnetic haptic engine. Additionally or alternatively, a reluctance machine may be formed by an electromagnet positioned against or magnetically coupled to a ferritic body. Also by way of example, the haptic engine may cause the button to pivot back-and-forth in relation to an axis, translate back-in forth parallel to the sidewall 122, or translate back-and-forth transverse to the sidewall 122. The force sensor may include, for example, a capacitive force sensor, a resistive force sensor, an ultrasonic force sensor, or a pressure sensor.

Figure 2:
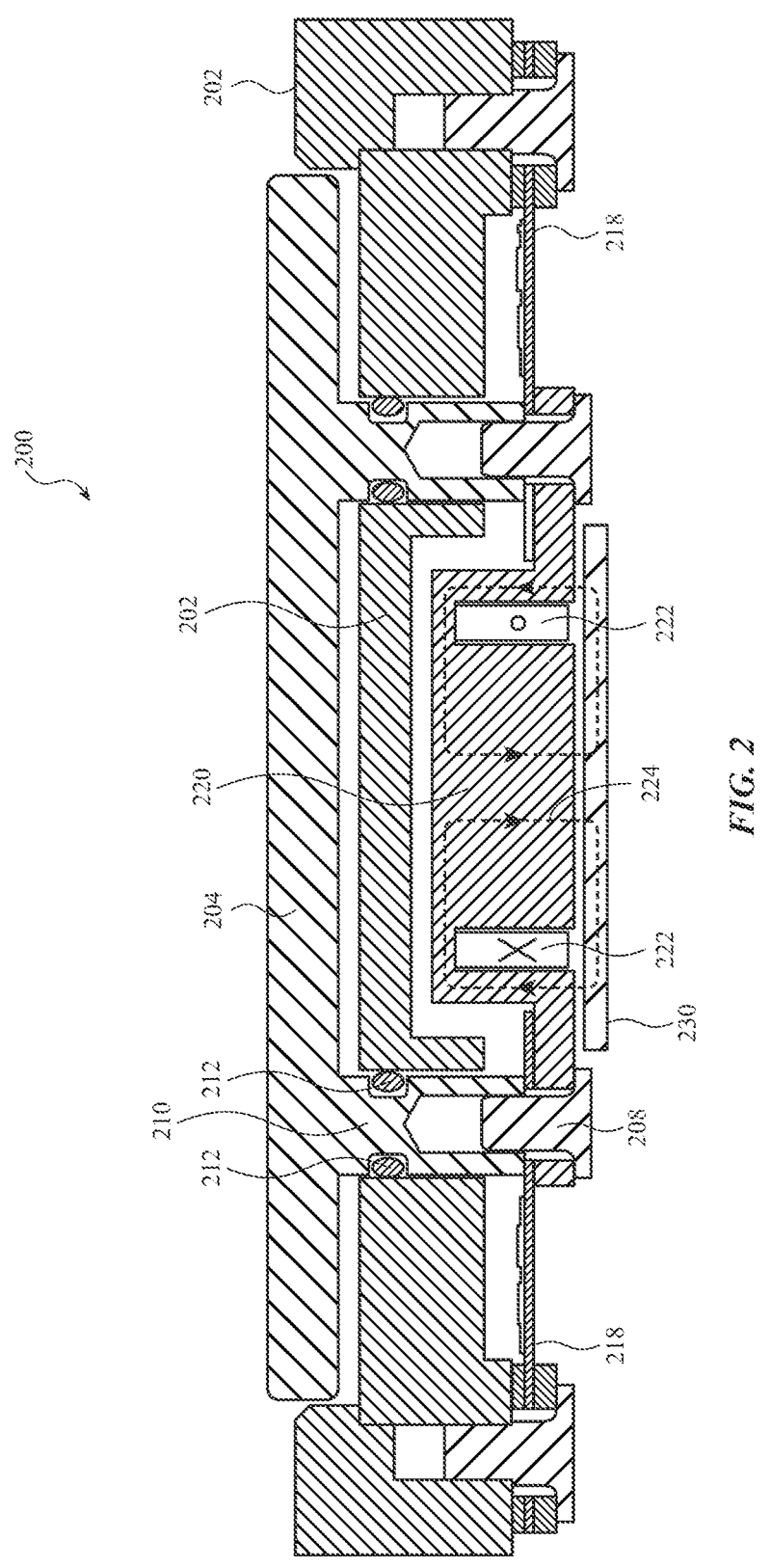
FIG. 2 is a cross-section of an example of a button assembly.

FIG. 2 shows a cross-section of a button assembly 200 in relation to a housing (e.g., the sidewall 202). The button assembly 200 may include a button 204 and a button base 220. The button base 220 may be mechanically coupled to an interior of the housing. For example, the button base 220 may be mounted to an interior of the sidewall 202, which may be an example of the sidewall 122 described with reference to FIGS. 1A-1C. The button base 220 may include a coil assembly having a coil with coil windings 222 operable to generate magnetic flux 224. The button base 220 may be mechanically and movably coupled to the housing (e.g., the sidewall 202 or a portion proximate thereto). That is, for example, the button base 220 may be mechanically coupled to the interior surface of the sidewall 202 by fasteners (e.g., screws) other means, such as by an adhesive or welds. Additionally, the button base 220 may be moveable with respect to a stator 230. The stator 230 may also be referred to as an attraction plate and may correspond to a portion of a stator assembly that is positioned with the coil assembly such that a magnetic circuit may be formed between the coil assembly, the stator 230, and a gap therebetween.

Base legs 208 may be slidably coupled with button legs 210 of the button 204. For example, the base legs 208 may have a narrower circumference or cross-sectional area than the button legs 210 such that the base legs 208 may slidably couple into a recess portion of the base legs as shown in the example of FIG. 2. In some cases, an o-ring 212 or similar toric joint may be positioned or formed between each button leg 210 of the button 204 and the sidewall 202. Alternatively or additionally, a diaphragm seal, a gasket or other type of seal may be positioned or formed between the button base 220 and sidewall 202. The o-ring 212 may prevent moisture, dirt, or other contaminants from entering a device through a button base-to-sidewall interface. When button 204 is pushed, a portion of the button legs 210 may apply a force to a portion of the button base 220 thereby moving the coil assembly closer to the stator 230 thereby reducing the gap therebetween.

Force sensors 218 may be configured to detect an amount of force that is applied to the button 204 and consequently applied to the button base 220. In various embodiments, the force sensor 218 may be a strain gauge, capacitive force sensor, resistive force sensors, etc. That is, for example, force sensors 218 may be used to measure the deformation that the user causes to the button assembly 200. In some instances, force sensors 218 may provide varied measurements through the life cycle of the button assembly. In other words, the force sensors 218 may delaminate, become damaged, or otherwise experience a shift in resistance over time causing inaccuracies in the force measurements used for determining the gap distance between the coil assembly and the stator 230. It is to be appreciated that force sensors 218 can provide an accurate measurement of the instantaneous change in the force being applied to the button 204 despite any miscalibrations or inaccuracies associated with determining the gap distance.

Accordingly, button assembly 200 may additionally or alternatively include a gap sensing circuit as described herein. For example, the button 204 may extend through the housing and be mechanically coupled to a haptic engine and operatively coupled with a gap sensing circuit and/or a force sensor. In some embodiments, the haptic engine may be defined as including the button base 220 including the coil assembly and the stator 230. In some variations, the haptic engine may further include additional moveable objects (e.g., rotors) positioned in or mechanically coupled with the moveable assembly 404. In some embodiments, the haptic engine, the gap sensing circuit, and/or the force sensor may be combined in a single module. In some embodiments, the gap sensing circuit may include a sensing resistor and associated circuitry for sensing a gap within the haptic engine using a reluctance engine coil (e.g., coil windings 222) of the haptic engine. Additionally, gap sensing circuits as described herein may be used as a replacement for or in combination with force sensors of other user input mechanisms such as but not limited to the display 104, front cover 106, or virtual button 116 of device 100 described with respect to FIGS. 1A-1C.

Figure 3:
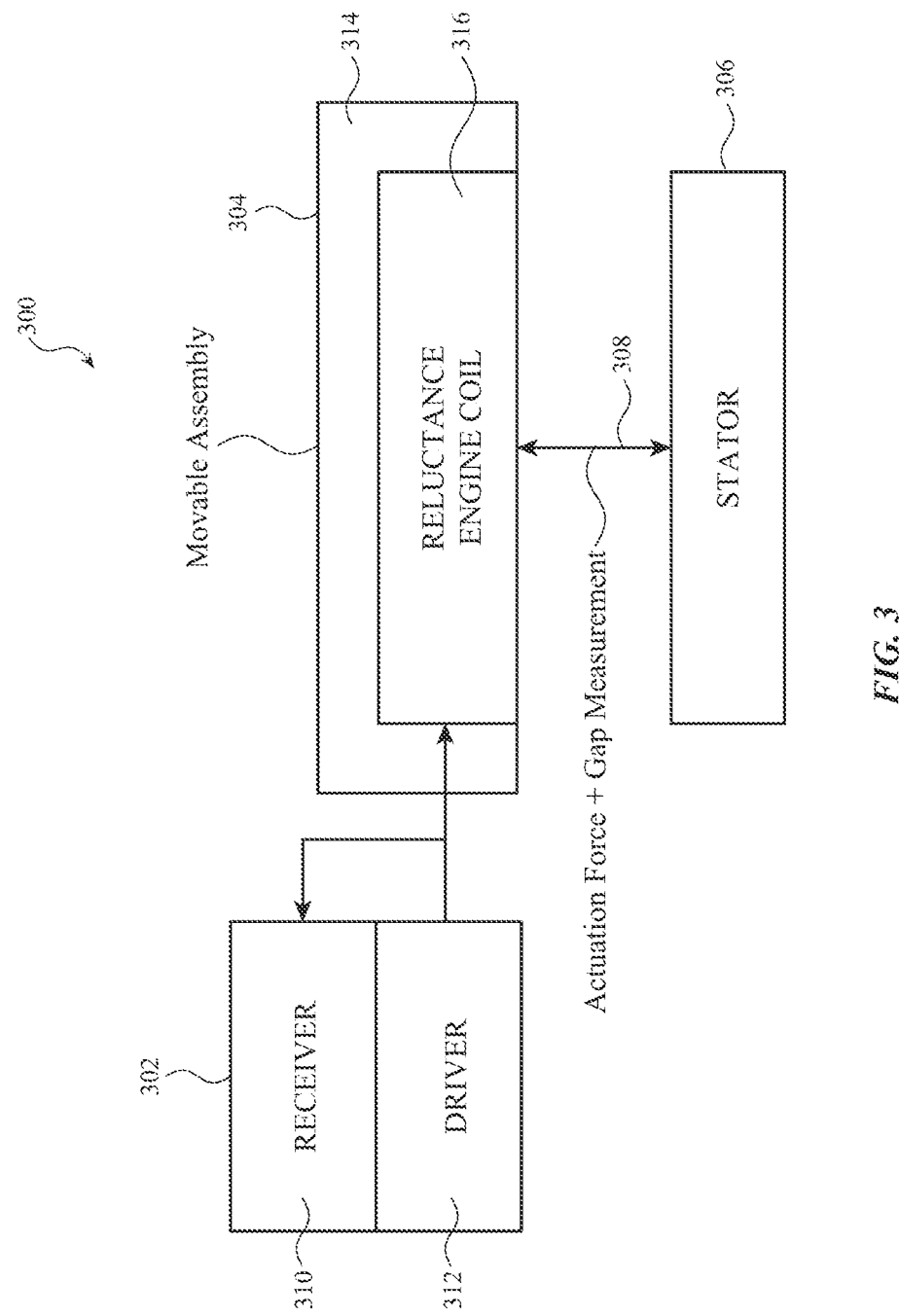
FIG. 3 shows a diagram of an example of a module for sensing a change in a gap within a haptic engine caused by a force applied to a button assembly.

FIG. 3 shows a diagram of module 300 for sensing a change in a gap within a haptic engine caused by a force applied to a button assembly. Module 300 includes a gap sensing circuit 302 electrically coupled to a moveable assembly 304 and a stator 306. Module 300 also includes a gap 308 between the moveable assembly 304 and the stator 306. In some instances, the stator 306 may be referred to as an attraction plate. The gap sensing circuit 302 (e.g., a backend circuit associated with haptic operation) may include receiver circuitry 310 and driver circuitry 312. Moveable assembly 304 includes a casing 314 that houses a reluctance engine coil 316. The receiver circuitry 310 of the gap sensing circuit 302 may obtain and demodulate signals from the reluctance engine coil 316 after input signals have been driven into the reluctance engine coil 316 by the driver circuitry 312.

The gap sensing circuit 302 may include a haptic drive mode and an inductive sensing mode. In the haptic drive mode, the driver circuitry 312 may provide signals to the reluctance engine coil 316 for generating a haptic output and in the inductive sensing mode, the driver circuitry 312 may provide signals to the reluctance engine coil 316 for sensing the gap 308 in the haptic engine. In some instances, the gap 308 can be defined as distance between opposing surface of the moveable assembly 304 and the stator 306. That is, for example, a distance (or an average distance) between a surface of the casing 314 facing the stator 306 and a surface of the stator 306 (e.g., an attraction plate) facing the casing. Application of a force that operates to mechanically close the gap 308 will cause a change in impedance (reactive and real) detected by the gap sensing circuit 302. That is, for example, a force measured grams (g) will have a corresponding change in inductance measured in microhenries (μH), and, similarly, a change in resistance in ohms (Ω) at sufficiently high sensing frequency.

As compared to force sensors, gap sensing techniques described herein may advantageously include fewer measurement components that are mechanically stressed by the moveable assembly 304. Additionally, some conventional techniques for determining a gap between a mover and a stator include having a sensing coil specifically designed for sensing the gap and a separate engine coil specifically designed for providing the haptic output and capable of driving the necessary power for generating the haptic sensation. By contrast, embodiments disclosed herein utilize a reluctance engine coil 316 for both the gap sensing operation and the haptic output operation. Advantageously, by using the reluctance engine coil 316 as the sensing coil, the gap distance determined may more accurately approximate the actual gap distance desired for haptic engine power decisions as compared to a separate sensing coil disposed a distance from the separate engine coil that may be used to measure a gap distance. As such, a gap distance measured by a separate sensing coil may be slightly different from the actual gap associated with the engine coil.

Moreover, it is to be appreciated that the reluctance engine coil 316 itself is used as a stimulus during the inductive sensing mode (e.g., a signal is actively applied to the reluctance engine coil 316) for calculating the physical distance of gap 308. Alternative measurement techniques, for instance, may use a coil to detect a change in magnetic flux generated by another device (e.g. a magnet moving proximate to the coil). However, these alternative measurement techniques typically still require movement or mechanical stress of measurement components.

Figure 4A:
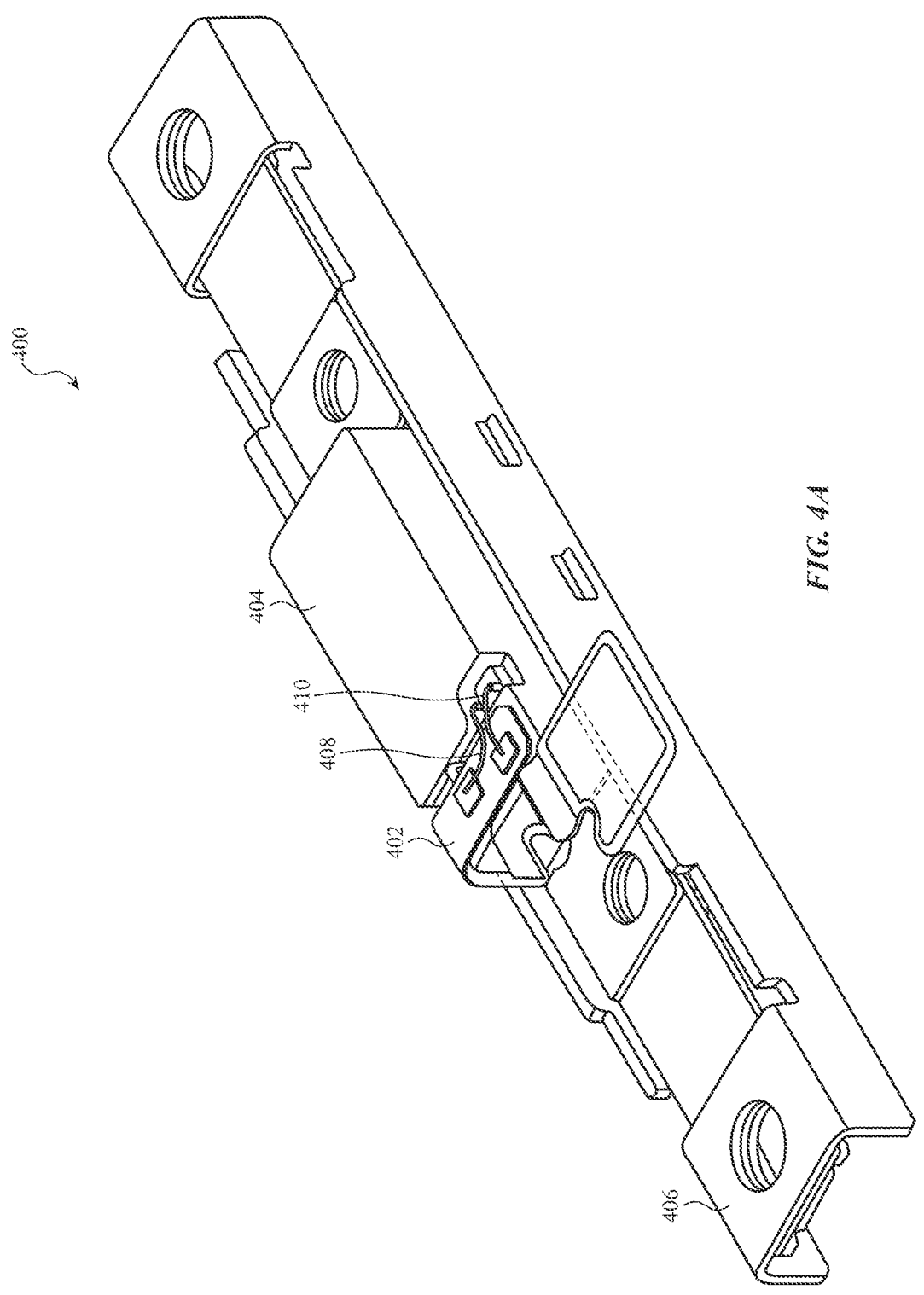
FIG. 4A shows a perspective view of an example of a module for sensing a change in a gap within a haptic engine caused by a force applied to a button assembly.

FIG. 4A shows a perspective view of a module 400 for sensing a change in a gap within a haptic engine caused by a force applied to a button assembly. Module 400 may include some or all of the features described with respect to button assembly 200 and module 300, as well as other gap sensing techniques described herein. The button assembly is removed from the view of FIG. 4A to provide a clearer view of other features in module 400. It is to be understood that a button assembly or other user input structure would be mechanically coupled to at least the moveable assembly 404 of module 400. Module 400 includes a flexible printed circuit board 402 and the moveable assembly 404 disposed in a mounting frame 406. Mounting frame and other features (e.g., holes and housing structure) may be similar to those described with respect to FIG. 2. The reluctance engine coil of moveable assembly 404 may be electrically connected to flexible printed circuit board 402 via a first lead 408 and a second lead 410. However, it is to be understood that in various embodiments, flexible printed circuit board 402 may include additional wiring or leads. For example, when force sensors are used to additionally measure the change in the gap within the haptic engine, wiring from the force sensors to the flexible printed circuit board 402 may be included.

Figure 4B:
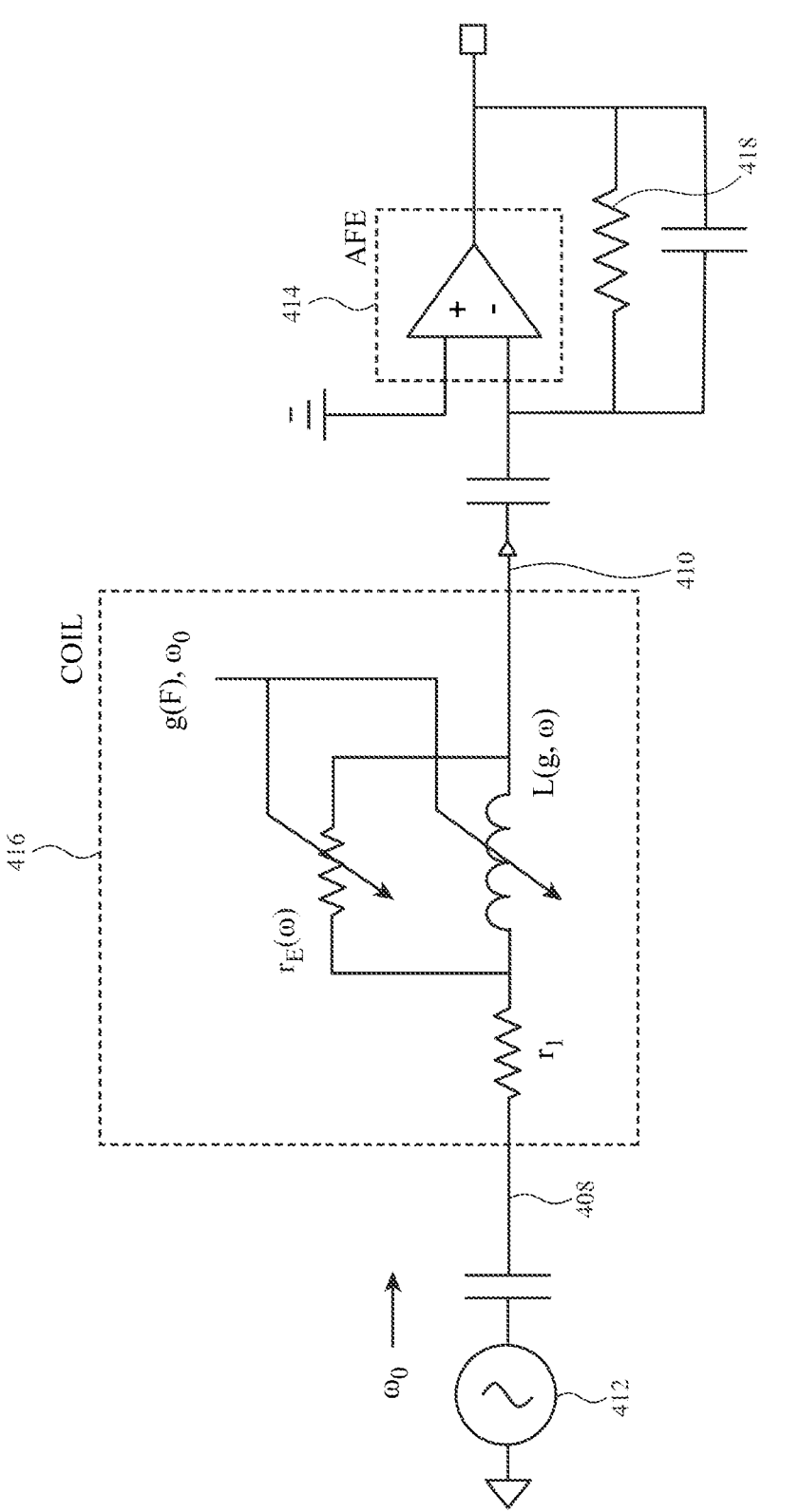
FIG. 4B shows a schematic diagram of an example of gap sensing circuitry that may be used in the module of FIG. 4A.

FIG. 4B shows a schematic diagram of gap sensing circuitry that may be used in flexible printed circuit board 402 or other gap sensing circuits described herein. In the inductive sensing mode, a carrier frequency source 412 may provide a signal via the first lead 408 to stimulate the reluctance engine coil 416. At a set carrier frequency, the analog front end 414 may be used to amplify the voltage across current sensing resistor 418. In this manner, an impedance change in the reluctance engine coil 416 can be measured at the set carrier frequency.

It is to be understood that different carrier frequencies may be used in various embodiments given the benefit of the present disclosure. In some embodiments, the carrier frequency may be set within a frequency range from 5 to 40 kHz. In some variations, the set carrier frequency is a high frequency, which may advantageously settle much faster than a lower frequency thereby enabling a quicker measurement of the impedance change to be detected in the reluctance engine coil 416. It is to be appreciated that both inductance and resistance at a carrier frequency are functions of frequency and are nonlinear. Certain properties of the ferritic materials used in the moveable assembly 404 (e.g., the reluctance engine coil 416 and associated casing) are frequency dependent. For example, based on skin effects associated with ferritic materials, the current cross-section may become different as the frequency of the signal applied to the reluctance engine coil 416 increases.

In some embodiments, the complex impedance of the reluctance engine coil 416 may be measured periodically in the background at the set carrier frequency, for example, when the gap sensing circuit associated with flexible printed circuit board 402 operates in the inductive sensing mode. The gap sensing circuit determines the gap distance based on an inductance of the measured complex impedance. In some embodiments, a resistance of the reluctance engine coil 416 can be used instead of the inductance to determine gap distance. In some embodiments, a combination of the inductance and the resistance of the reluctance engine coil 416 is used to determine gap distance. For example, a single-tone resistive component may be compensated by the inductive component at the same frequency. That is, both the inductance and the resistance at the carrier frequency may change as a function of a gap change. Accordingly, it may be beneficial to combine both the inductive and the resistive components as an input to a gap sensing model in some embodiments. It is to be appreciated that thermal stability may be greatly improved based at least in part on combining both the inductive and resistive components as the input to the gap sensing model, for example, due at least in part to a canceling effect between resistivity and skin-depth change.

When one of these periodically-determined gap distances satisfies a threshold gap distance, for instance, by a pressure force applied by the user to a button or input structure mechanically coupled to the moveable assembly 404, the gap sensing circuit switches to the haptic drive mode. In the haptic drive mode, the gap sensing circuit provides a driving signal to activate a haptic engine of the module 400. The haptic engine creates a haptic output that may provide a sensation mimicking a mechanical button or other sensation intended to communicate a meaning to the user. In some embodiments, the haptic engine includes the moveable assembly 404 and a stator. In some variations, the haptic engine may further include additional moveable objects (e.g., rotors) positioned in or mechanically coupled with the moveable assembly 404.

Figure 5:
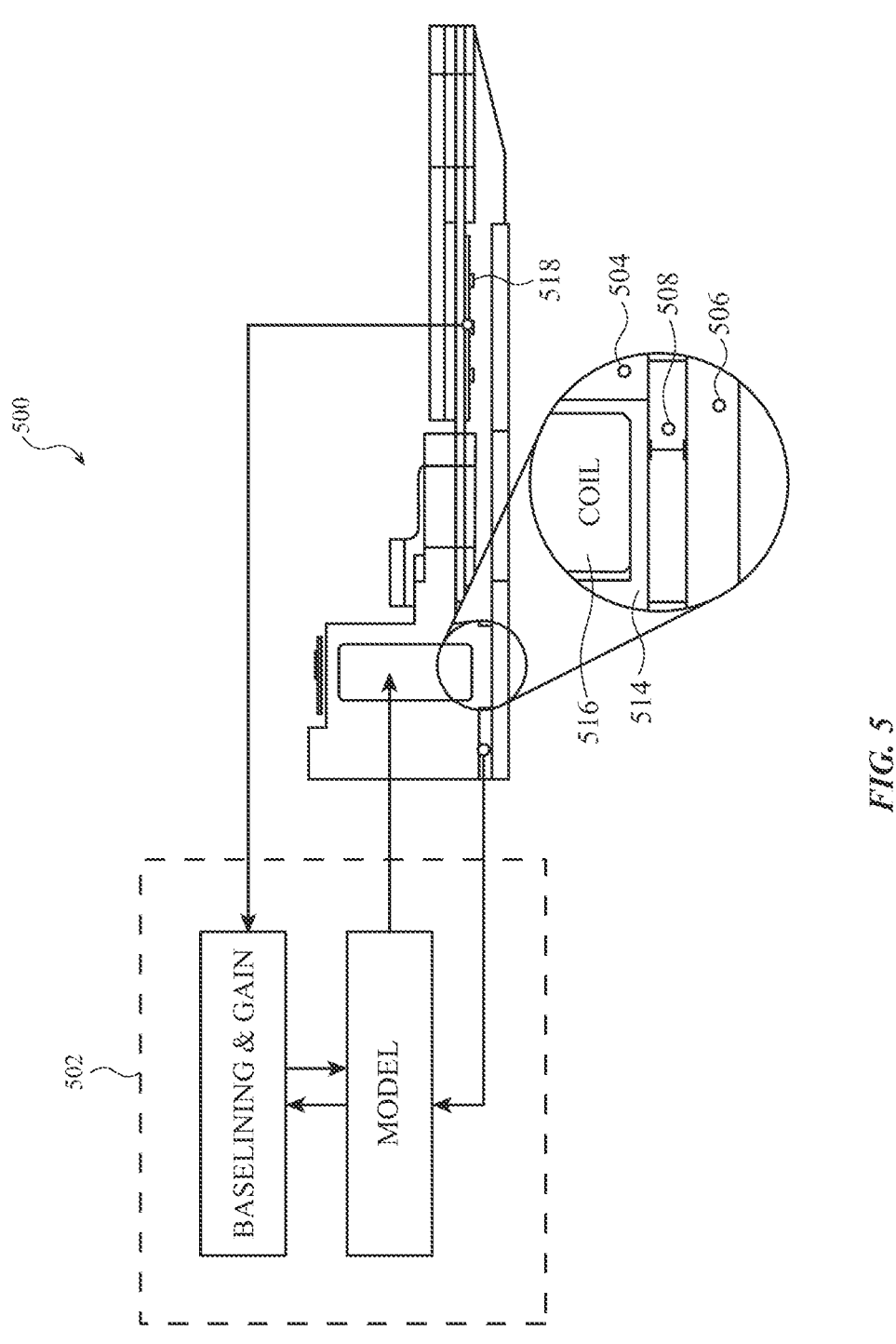
FIG. 5 shows a diagram and side view (with an exploded view) of an example of a module for sensing a change in a gap within a haptic engine caused by a force applied to a button assembly.

As shown in FIG. 5, module 500 may include a gap sensing circuit 502 electrically coupled to a moveable assembly 504 and a stator 506, which may be separated by gap 508. Module 500 may include some or all of the features described with respect to button assembly 200, module 300, module 400, as well as other gap sensing techniques described herein. In various embodiments, module 500 may operate singularly or in conjunction with force sensors 518 described herein. Using gap sensing circuit 502 in conjunction with force sensors 518 to sense the gap 508 may beneficially provide a consistent haptic output that may be generated by reluctance engine coil 516 disposed in casing 514. In some embodiments (e.g., with longer buttons and extended longitudinal gaps), the gap sensing operation may include an average gap determination between the moveable assembly 504 and a stator 506. That is, for example, depending on a position of the applied force to the button, there may be tilt move of the button (e.g., applying the force to one side or edge of the button) causing differences in the physical gap being measured if the applied force were applied more directly at the center of the button. Beneficially, this determination of the average gap more effectively relates to the reluctance engine performance (e.g., a more precise calibration of the reluctance engine performance and overall system operation). In some embodiments, differences in gap sensing detected for an applied force to the button may be instructive as to the user's intent (e.g., when the button may be implemented as a rocker button where a first end indicates a different intent than a second end, such as volume up or down).

In some instances, casing 514 of the moveable assembly 504 may be a ferritic material. That is, for example, lower reluctance may be observed from an end of the coil windings of the reluctance engine coil 516 to an edge of the casing 514 as compared to a higher reluctance from the edge of the casing 514 across the gap 508 to the stator 506. The stator 506 may also be a ferritic material. It is to be understood that with respect to the gap sensing technique described herein, a magnetic flux loop may be considered a magnetic circuit. That is, for example, the moveable assembly 504 (or coil assembly), gap 508, and the stator 506 may be considered as components being in series for the magnetic circuit. In this manner, embodiments applying the gap sensing circuits in conjunction with moveable assembly and stator structural arrangements and/or orientations as described herein may benefit from better phase matching between voltage and current for a given configuration and frequency pairing.

Figure 6A:
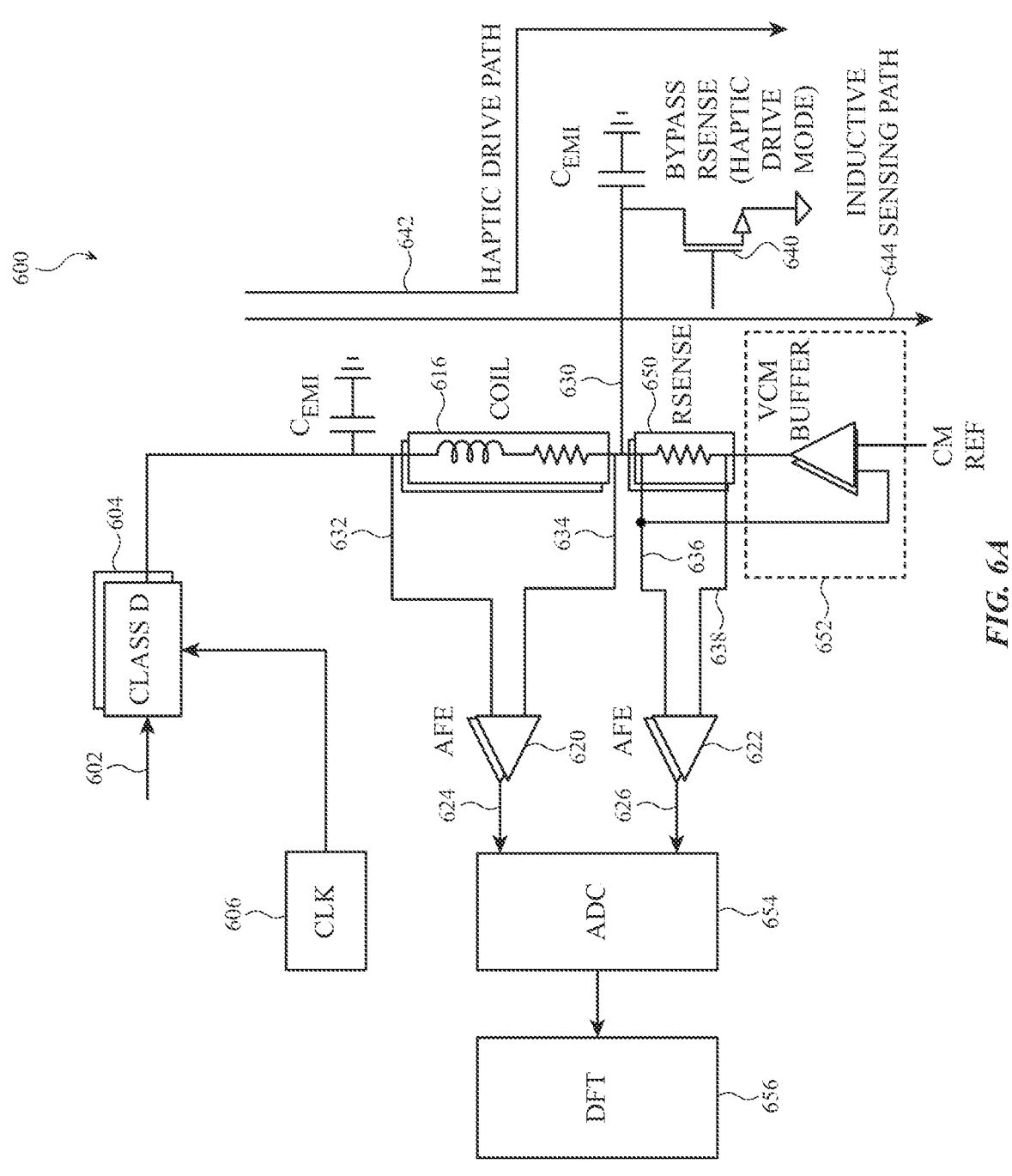
FIG. 6A shows a schematic diagram of an example of a gap sensing circuit that may be used in the module of FIG. 5.

FIG. 6A shows a schematic diagram 600 of a gap sensing circuit and reluctance engine coil 616 that may be used in the module of FIG. 5. It is to be understood that where the schematic diagram show overlapping blocks or objects, two of those blocks or objects may be included in various embodiments. For example, a first instance of an overlapping block or object may be associated with a first module (e.g., a module for a volume button) and a second instance of the overlapping block or object may be associated with a second module (e.g., a module for a power button) on a same device. For clarity, a single instance of an overlapping block or object will be described in the example of FIG. 6A and other Figures herein.

The gap sensing circuit includes amplifier 604, which drives an output in the reluctance engine coil 616. In some instances, the amplifier 604 is a Class D amplifier. A reference clock 606 may be provided to amplifier 604. Amplifier 604 includes an internal resistor that senses current when the gap sensing circuit is operating in the haptic drive mode. When the gap sensing circuit is operating in the haptic drive mode, transistor 640 is closed. That is, for example, the gate of transistor 640 is driven with a high voltage such that drain to source is short circuited. Consequently, a current path 642 in the haptic drive mode passes through amplifier 604, reluctance engine coil 616, lead 630, and transistor 640. That is, for example, in the haptic drive mode, the gap sensing circuit provides an energy efficient current path when the reluctance engine coil 616 is being energized. The value of the current for current path 642 in the haptic drive mode may be obtained from the internal resistor of amplifier 604.

When the gap sensing circuit is operating in the inductive sensing mode, transistor 640 is opened. That is, for example, the gate voltage of transistor 640 is driven to zero such that drain to source becomes an open circuit (e.g., has a high impedance). Consequently, when a current is driven by amplifier 604, a current path 644 in the inductive sensing mode passes through amplifier 604, reluctance engine coil 616, and sensing resistor 650. In some instances, the sensing resistor 650 is buffered by voltage common mode buffer 652.

Figure 6B:
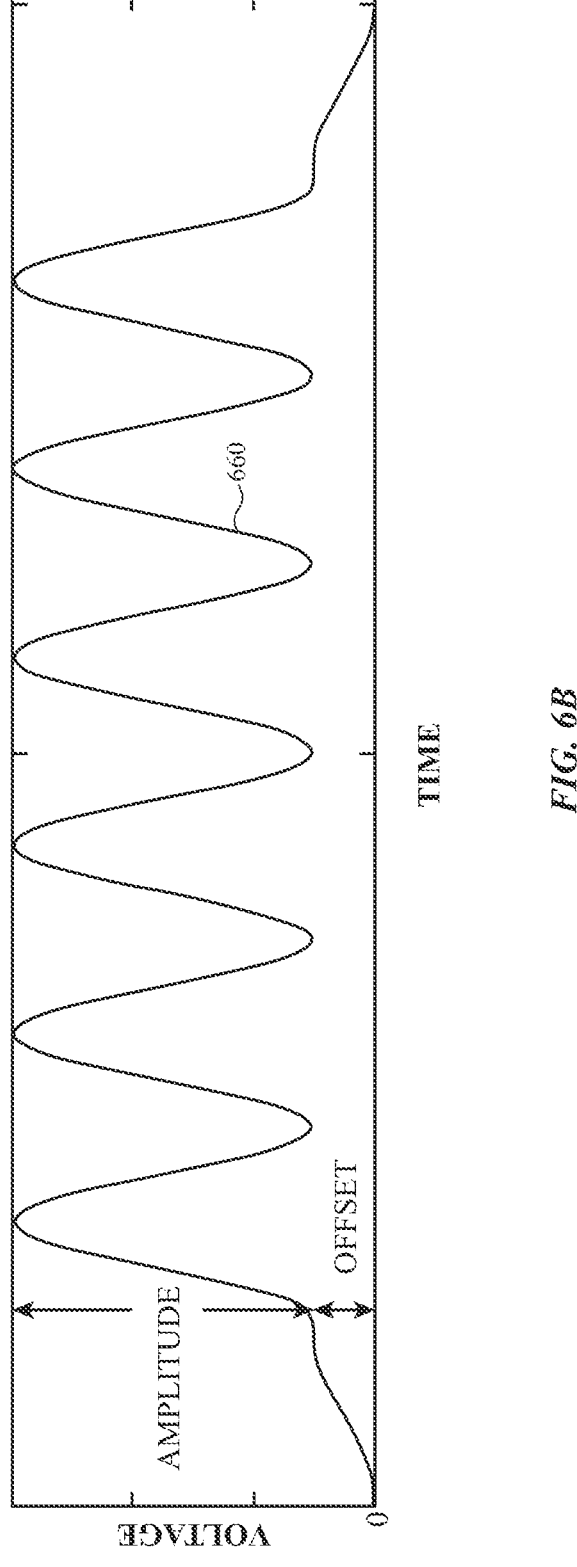
FIG. 6B shows a plot of voltage over time for an example of a signal that may be used in the gap sensing circuit of FIG. 6A.
Figure 6C:
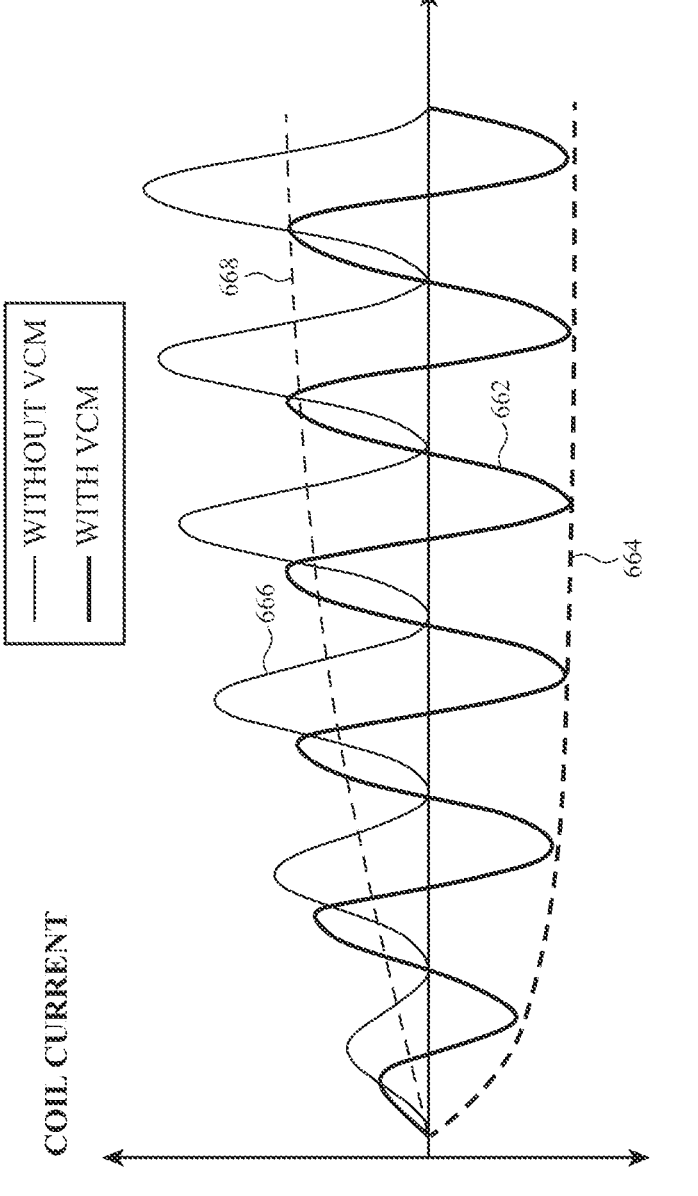
FIG. 6C shows a plot for an example of signals (and resulting impedances) that may be used in the gap sensing circuit of FIG. 6A.

With additional reference to FIGS. 6B and 6C, when driving current through the reluctance engine coil 616 in the inductive sensing mode, a single-ended signal 660 (shown in FIG. 6B) having a first voltage with an offset may be used. However, in some variations, a single-ended signal without an offset is provided at signal input 602. The voltage common mode buffer 652 may provide a buffer voltage similar to the first voltage provided at signal input 602. As such, the voltage common-mode buffered signal 662 (shown in FIG. 6C) applied to the reluctance engine coil 616 during the inductive sensing mode may be an alternating current signal. Such an alternating current signal to drive the reluctance engine coil 616 may be preferable when performing gap sensing and measurement in the inductive sensing mode. For example, by driving the reluctance engine coil 616 with an alternating current signal, the undesirable effects of voltage and frequency dependent nonlinearity may be mitigated. As shown in FIG. 6C, the coil current settles faster as shown in current time plot 664 with the voltage common-mode buffered signal 662 that the current time plot 668 with single-ended signal 666.

By contrast, in some embodiments when driving current through the reluctance engine coil 616 in the haptic drive mode, a single-ended signal is used. That is, only positive voltage and current is received at the reluctance engine coil 616 from signal input 602 and amplifier 604 during the haptic drive mode in accordance with some embodiments. Such a single-ended signal to drive the reluctance engine coil 616 may be preferable when performing a haptic output. In some instances, the single-ended signal provided at signal input 602 has a second voltage different from the first voltage used during the inductive sensing mode.

In the inductive sensing mode, the voltage is measured across the load associated with the reluctance engine coil 616. For example, a voltage between lead 632 and lead 634 may be measured. That is, for example, a first analog front end 620 may be electrically coupled to lead 632 and lead 634. The first analog front end 620 may pass an output 624 to analog-to-digital converter 654, which may provide a digital signal to the discrete Fourier transform block 656 for digital signal processing. The analog-to-digital converter 654 may be configured with a rate that is an order of magnitude higher than the carrier frequency for a particular embodiment. Additionally, the current across the load associated with the reluctance engine coil 616 is sensed. For example, a voltage drop between lead 636 and lead 638 for sensing resistor 650 may be measured. That is, for example, a second analog front end 622 may be electrically coupled to lead 636 and lead 638. The second analog front end 622 may also pass an output 626 to the analog-to-digital converter 654, which may provide a digital signal to the discrete Fourier transform block 656 for digital signal processing. The discrete Fourier transform block 656 may be performed to calculate the complex impedance at the set carrier frequency. Additionally or alternatively, other digital signal processing techniques may be used to calculate the complex impedance.

Figure 7:
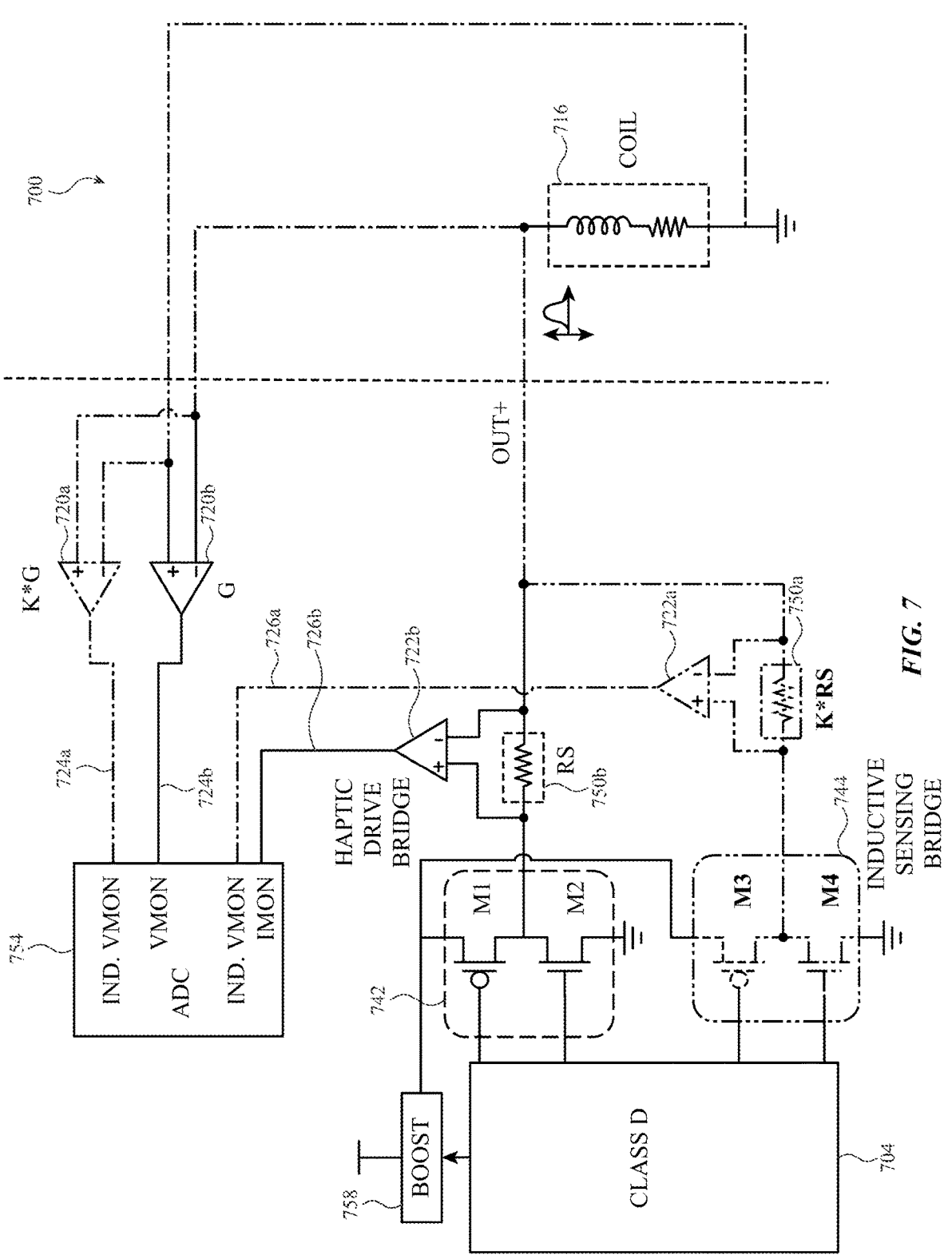
FIG. 7 shows a schematic diagram of an alternative example of a gap sensing circuit that may be used in a module for sensing a change in a gap caused by a force applied to a button assembly.

FIG. 7 shows a schematic diagram 700 of a gap sensing circuit and reluctance engine coil 716 that may be used additionally or alternatively in the module of FIG. 5. Embodiments and variations of the gap sensing circuit described with respect to FIGS. 6A-6C may be incorporated into the gap sensing circuit and reluctance engine coil 716 described with respect to FIG. 7.

The gap sensing circuit includes amplifier 704, which provides output to a switching network or bridge network. An inductive sensing bridge 744 may include transistors M3 and M4 that are used to switch a first signal through the reluctance engine coil 716 during the inductive sensing mode. The inductive sensing bridge 744 operates to activate path 726*a* to analog-to-digital converter 754 through sensing resistor 750*a* and analog front end 722*a* for measuring a current in the inductive sensing mode. A haptic drive bridge 742 operates to activate path 724*a* to analog-to-digital converter 754, through analog front end 720*a*, for measuring a voltage in the inductive sensing mode. The haptic drive bridge 742 may include transistors M1 and M2 that are used to switch a second signal through the reluctance engine coil 716 during the haptic drive mode. The haptic drive bridge 742 operates to activate path 726*b* to analog-to-digital converter 754 through sensing resistor 750*b* and analog front end 720*b* for measuring a current in the haptic drive mode. The haptic drive bridge 742 also operates to activate path 724*b* to analog-to-digital converter 754 through analog front end 722*b* for measuring a voltage in the haptic drive mode. Boost circuit 758 may be connected to the inductive sensing bridge 744 and the haptic drive bridge 742.

Advantageously, there may be less resistance in a current path of the reluctance engine coil 716 as compared to other circuit designs, thereby making the gap sensing circuit shown in schematic diagram 700 more efficient in some respects. A different set of gains K*G may be used for inductive sensing mode. Additionally, sensing resistor 750*a* may have a higher value than sensing resistor 750*b* (e.g., more current may be driven through reluctance engine coil 716 during the haptic drive mode). In some instances, transistors M3 and M4 are sized as smaller field effect transistors than transistors M1 and M2 because less power is driven into the reluctance engine coil 716 via the first signal in the inductance sensing mode. A tradeoff of the gap sensing circuit shown in schematic diagram 700 is that the settling of the impedance becomes more nonlinear (e.g., as shown in time plot for the current time plot 668 of FIG. 6C).

The current and voltage measurements made during the haptic drive mode are made with different gain than when measuring current and voltage in the inductive sensing mode. The use of different gain for different signals (e.g., the first signal and the second signal) can be beneficial from the circuit implementation point of view, to match gain between the current and voltage amplifiers to maintain a phase match, or to maximize gains in the current and voltage amplifiers to extract maximum signal-to-noise ratio out of the measurement circuit. In other variations of the gap sensing circuit, a voltage common mode buffer (e.g., voltage common mode buffer 652 shown in schematic diagram 600) may be shared between multiple reluctance engine coils (e.g., when switching between open and closed on the ground side of a reluctance engine coil).

Figure 8:
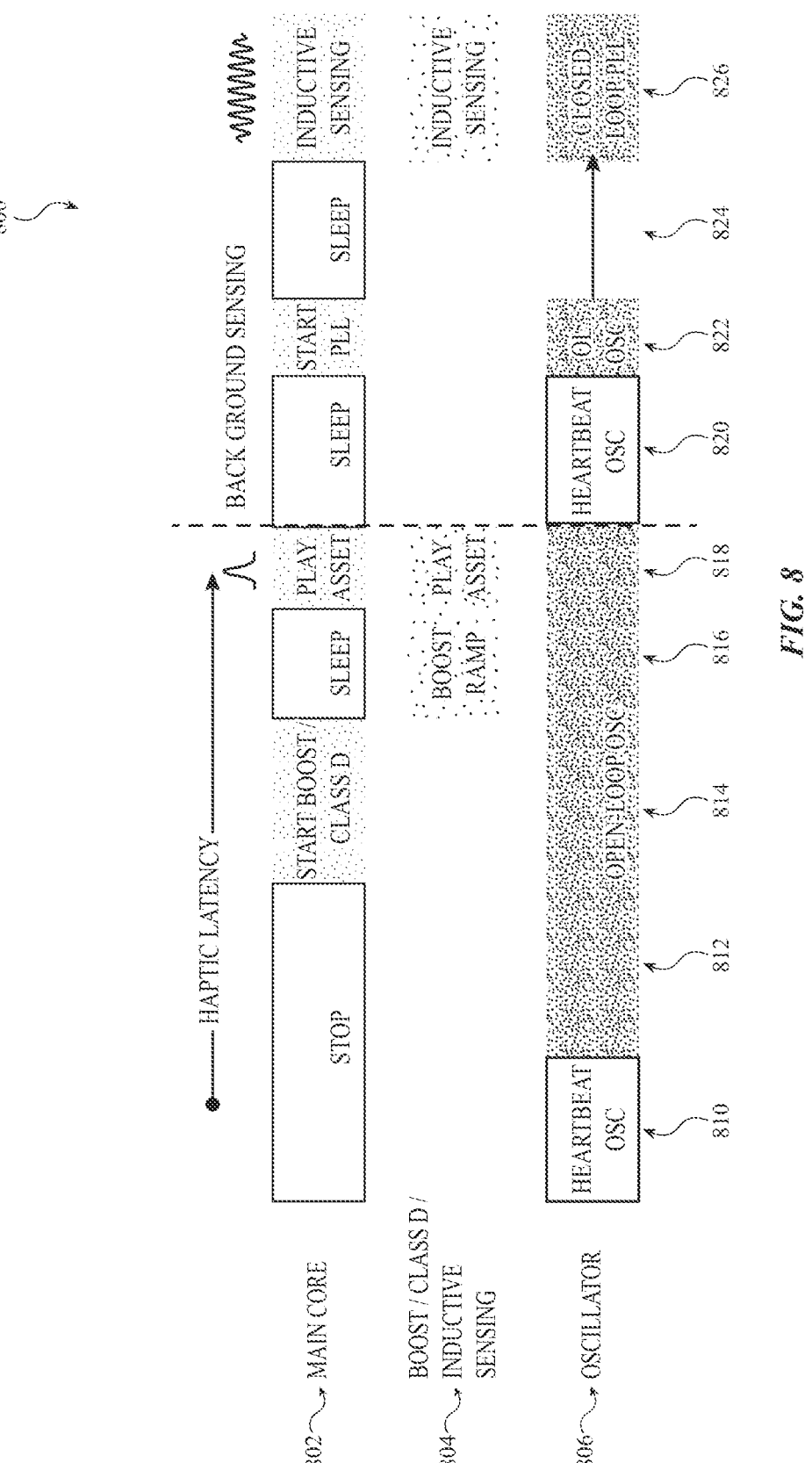
FIG. 8 illustrates an example of a timing diagram that may be used by a gap sensing circuit in a module for sensing a change in a gap caused by a force applied to a button assembly.

FIG. 8 shows a timing diagram 800, which may be used with any of button assembly 200, module 300, module 400, or module 500. Various timing operations may be grouped for gap sensing circuit efficiency. For example, digital controller operations timeline 802 refers to the timing of those operations associated with the digital control of haptic engine activation or engagement. Circuit operations timeline 804 refers to the timing of certain analog and power circuit operations. Oscillator operations timeline 806 refers to the timing of oscillation operations associated with certain haptic drive and inductive sensing operations.

Force sensors, when included in an embodiment, may be scanned in the background during a haptic latency period, for example, starting at a time 810. That is, for example, the force sensor voltage may be quantized, and this quantized value may be a function of the force applied to a moveable assembly (e.g., through a button or input structure). Also, at time 810, digital controller operations are temporarily stopped to minimize power consumption and an oscillator operates in a low power and low frequency heartbeat mode oscillator mode. At time 812, the oscillator exits heartbeat mode and enters a high power and high frequency open loop mode in preparation to support haptic engine engagement. While in the haptic drive mode, the oscillator may operate in an open loop for consecutive time periods, time 814, time 816, and time 818. Performing haptic related operations in an open loop can be operationally efficient because haptic output operation can start immediately or very shortly, and it is not sensitive to frequency. At time 814 and time 816, operations in preparation to play the haptic asset (e.g., to generate a haptic output) may begin by starting the boost circuit and the amplifier operations and continuing until the haptic asset is played at time 818. The signal to drive the haptic asset may be a low frequency signal.

At time 820, inductive sensing operation may begin after the last force sensor scan (e.g., where the oscillator operates in the heartbeat mode) has been completed. At time 822, the digital controller starts the oscillator's phase lock loop operation to lock onto the reference clock. As noted herein, the frequency accuracy of the signals in the inductive sensing mode can be beneficial to certain measurement operations associated therewith. At time 824, the digital controller may temporarily enter a low power sleep mode while waiting for the oscillator to phase lock. At time 826, the circuit may be operated in a closed-loop phase loop lock mode in which the inductive sensing operation may be performed. That is, for example, the gap sensing circuit may switch to the inductive sensing mode, drive a carrier frequency, and measure the complex impedance of the reluctance engine coil.

The timing diagram 800 is just one example of timing operations that can be performed by the modules and circuits described herein. Other timing operation techniques may be utilized given the benefit of the present disclosure.

Figure 9A:
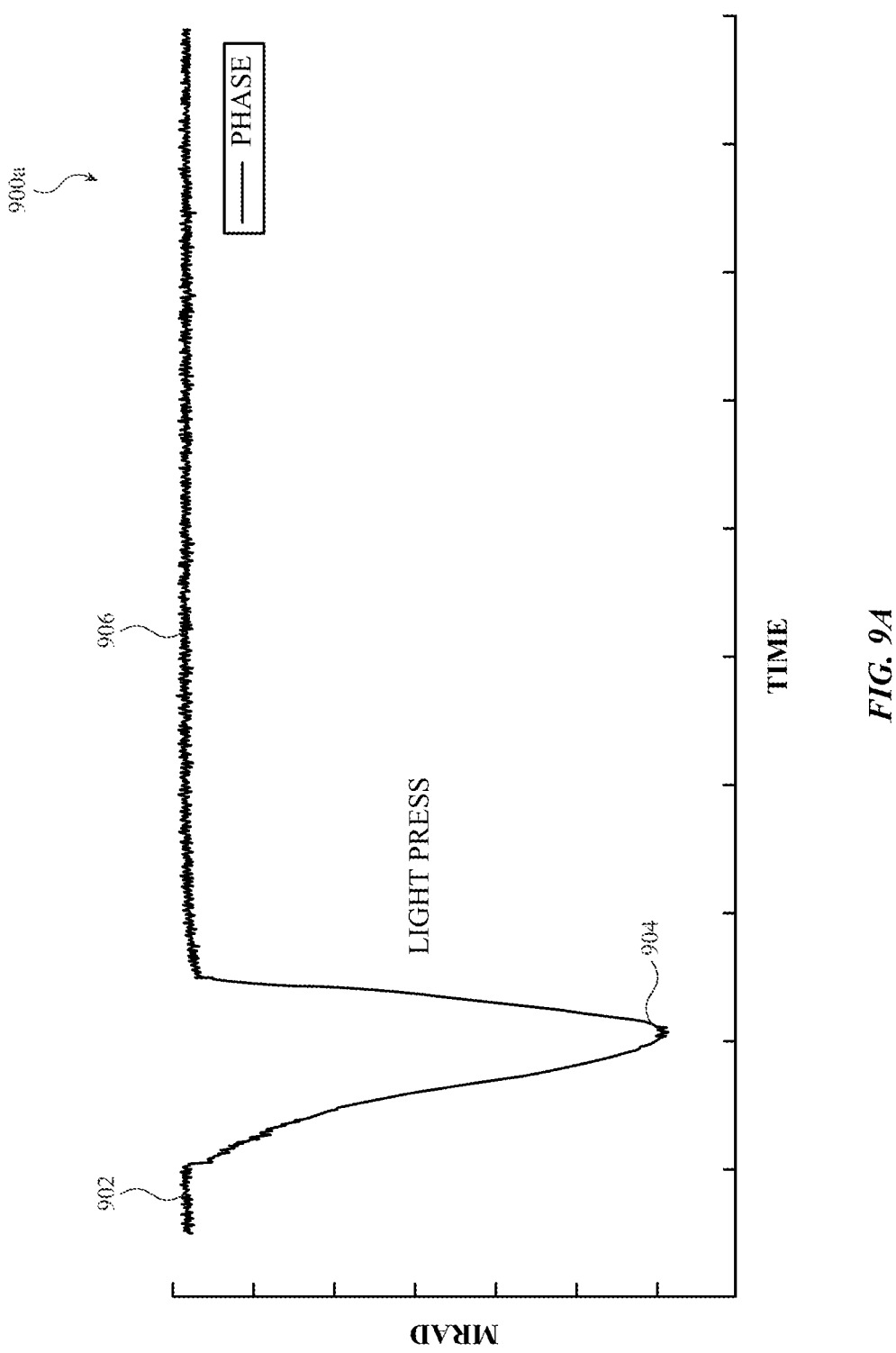
FIGS. 9A and 9B show plots of example forces applied to a button assembly.
Figure 9B:
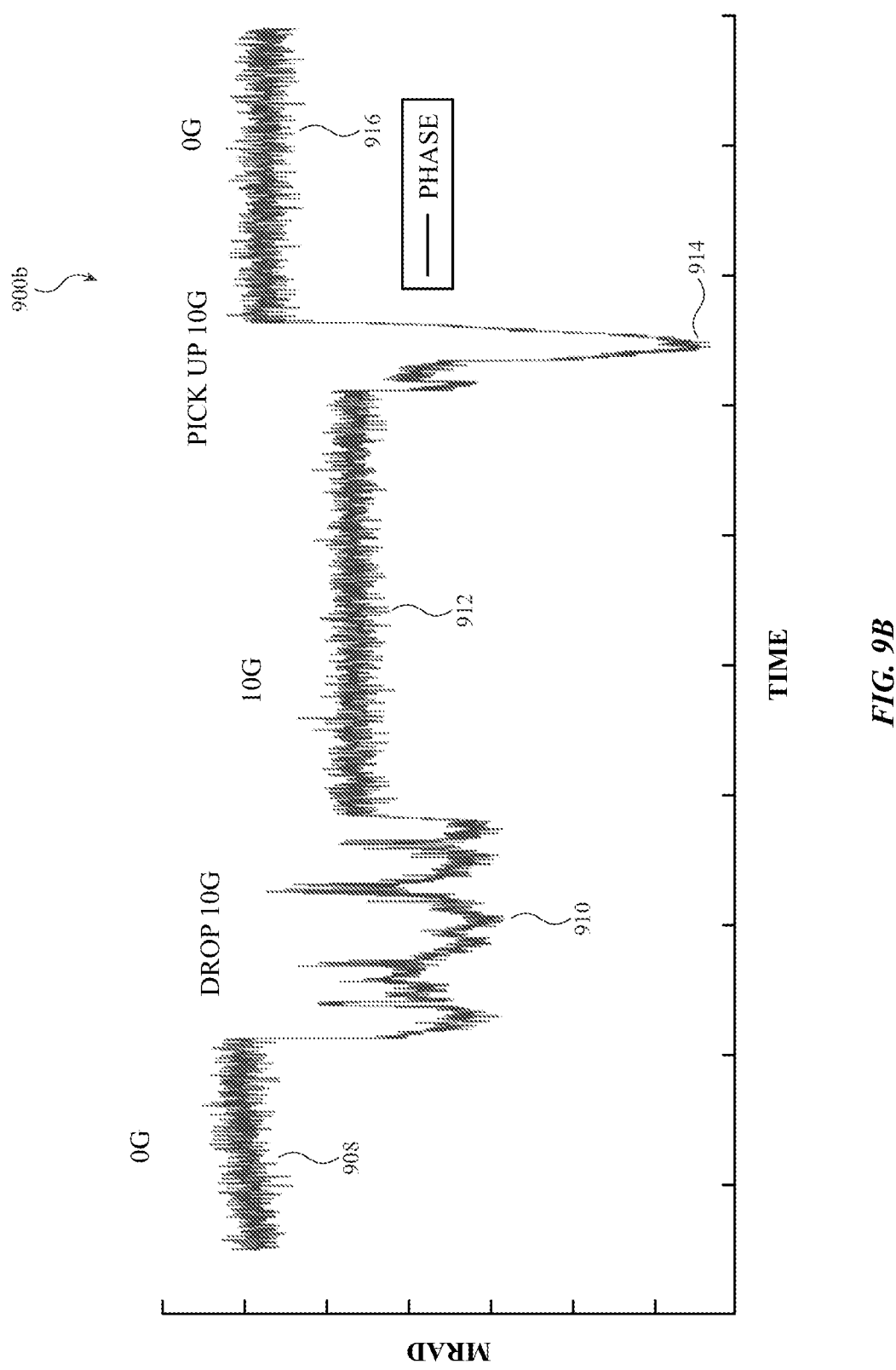

FIG. 9A shows a plot 900a of the phase change in impedance of the reluctance engine coil when a light press is performed on a button assembly designed in accordance with the techniques described herein. At 902, the button assembly may be in an idle state. The sensitivity and time response can be seen at 904, corresponding to a light press on the button. The measurement system may quickly stabilize subsequent to the light press as shown at 906. FIG. 9B shows an example plot 900b of the phase change in impedance of the reluctance engine coil when precision weights are placed on and removed from the button assembly, simulating a light press on the button assembly in accordance with the techniques described herein. That is, for example, single digit gram forces can be accurately sensed by the button assembly. At 908, the button assembly may be in an idle state and some negligeable noise can be seen it the phase plot. Some shuffling occurs when a 10 gram load is put on the button at 910, but quickly stabilizes as shown at 912. At 914, the 10 gram load is taken off of the button assembly. At 916, the button assembly quickly stabilizes back to the idle state.

Figure 10:
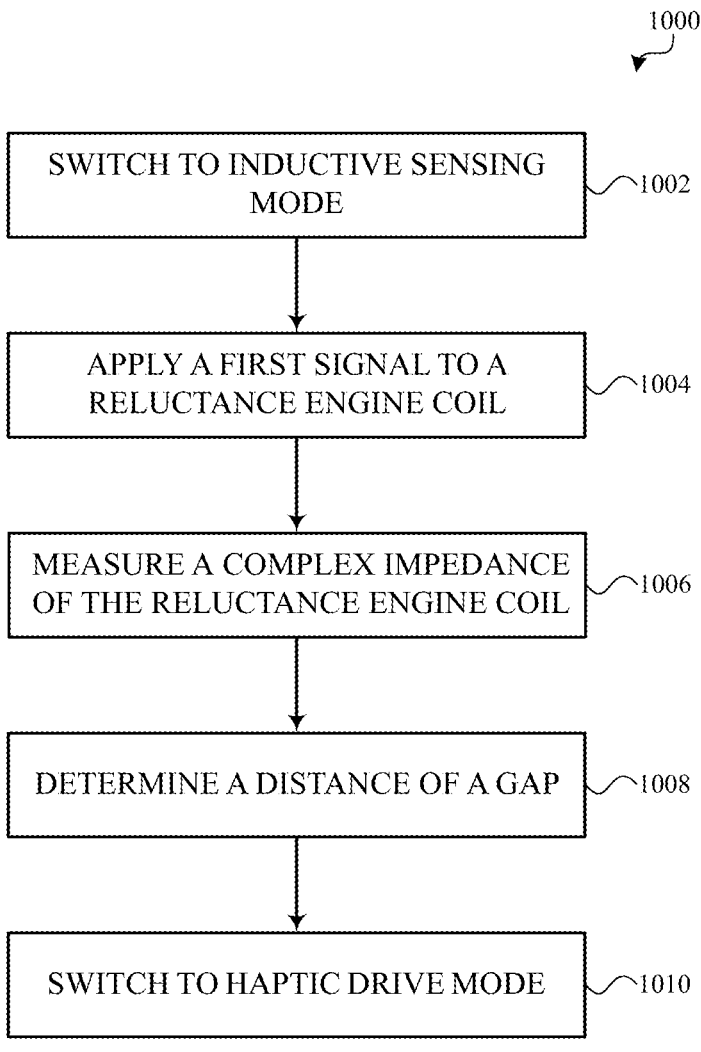
FIG. 10 illustrates an example method of sensing a gap via a reluctance engine coil for controlling haptic output.

FIG. 10 illustrates an example method 1000 of sensing a gap via a reluctance engine coil, for controlling haptic output. The method 1000 may be performed by, or using, any of the modules or button assemblies described herein. The method 1000 may also be performed by, or using, other modules or button assemblies as would be understood given the benefit of the present disclosure. In some embodiments, the method 1000 may also be performed by, or using, a device that incorporates a module or button assembly in accordance with aspects of the present disclosure.

At block 1002, the method 1000 may include switching a circuit from a haptic drive mode to an inductive sensing mode. That is, for example, the circuit may periodically switch to the inductive sensing mode to measure the complex impedance of the reluctance engine coil. When the circuit is in the inductive sensing mode, different circuit characteristics (e.g., signal type, amplifier gain, etc.) may be applied to the reluctance engine coil as compared to when the circuit is in the haptic drive mode. At block 1004, the method 1000 may include applying, via the circuit in the inductive sensing mode, a first signal to the reluctance engine coil. In some embodiments, the first signal is an alternating current signal.

At block 1006, the method 1000 may include measuring, via the circuit in the inductive sensing mode, a complex impedance of the reluctance engine coil based at least in part on the first signal. Using the measured real and imaginary components of complex impedance, the physical gap distance between the reluctance engine coil and the stator can be calculated. With the physical gap distance known, the overall state of the haptic engine can be determined. A device or module can then more precisely determine an exact power with which to drive the reluctance engine coil to provide a desired haptic output.

At block 1008, the method 1000 may include determining, via the circuit in the inductive sensing mode, a distance of a gap associated with the reluctance engine coil and a stator based at least in part on the measured inductance and the measured resistance. For example, a haptic output that provides the same sensation to the user each time the button or input device is pushed, regardless of the amount of force that the user exerts at that time, may be desirable in some embodiments. For example, if the user is exerting a significant amount of force to the button or a small amount of force to the button sufficient to satisfy the threshold force for triggering a haptic output response from the module, the module may be configured to provide a corresponding power signal for generating the appropriate closing force to adjust for the force being applied by the user at that particular time. The engine closing force, when energized, is nonlinear. For example, for the same power signal driven into the haptic engine, as the gap gets smaller the closing force gets larger in a nonlinear relationship. The closing force is a function of the integration of the flux density of gap volume, and each gap volume will have a corresponding effect on the resulting closing force.

At block 1010, the method 1000 may include switching the circuit from the inductive sensing mode to the haptic drive mode. That is, for example, the circuit may periodically switch to the haptic drive mode to generate a haptic output, for example, if a determined gap distance satisfies the threshold gap distance. When the circuit is in the haptic drive mode, different circuit characteristic (e.g., signal type, amplifier gain, etc.) may be applied to the reluctance engine coil as compared to when the circuit is in the inductive sensing mode.

In some embodiments, the method 1000 may also include applying, via the circuit in the haptic drive mode, a second signal different from the first signal to the reluctance engine coil. That is, for example, the power of the second signal may be based at least in part on the determined distance of the gap. As discussed herein, the power of the signal that drives the haptic output and the gap distance has a corresponding effect on the resulting closing force. To provide a same haptic sensation, the second signal used to provide a haptic output may be different from the first signal used to measure the complex impedance in the reluctance engine coil may be different in various way with respect to various signal characteristics as described herein.

In some embodiments of the method 1000, for example, an electronic device includes a plurality of housing elements; an input structure at least partially moveable with respect to at least one housing element of the plurality of housing elements; a coil assembly mechanically coupled to the input structure such that movement of the input structure causes movement of the coil assembly; a stator having a surface that is separated by a gap from a surface of the coil assembly; and a circuit operatively coupled to a processor, the circuit and the processor configured to: drive a first signal through the coil assembly; and determine a distance of the gap based at least in part on an impedance of the coil assembly when driving the first signal through the coil assembly.

In some embodiments of the method 1000, for example, the stator is mechanically coupled to the button such that movement of the button causes movement of the stator. In some embodiments, the coil assembly is connected within a housing defined by the plurality of housing elements with a surface of the coil assembly separated from the surface of the stator, forming the gap.

In some embodiments of the method 1000, for example, the circuit and the processor are further configured to drive a second signal different from the first signal through the coil assembly. In some embodiments, a power of the second signal is based at least in part on the determined distance of the gap.

In some embodiments of the method 1000, for example, the second signal is a single ended signal.

In some embodiments of the method 1000, for example, the second signal has a frequency different from the first signal.

In some embodiments of the method 1000, for example, an electronic device further includes a force sensor mechanically coupled to the coil assembly and electrically coupled to the circuit. In some embodiments, the circuit and the processor are further configured to determine the distance of the gap based at least in part on a signal from the force sensor.

In some embodiments of the method 1000, for example, the circuit includes a sense resistor electrically coupled with the coil assembly.

In some embodiments of the method 1000, for example, the impedance of the coil assembly is based at least in part on a value of current detected through the sense resistor when driving the first signal through the coil assembly.

In some embodiments of the method 1000, for example, the circuit and the processor are further configured to switch current from a first path to a second path. In some embodiments, the first path includes the coil assembly electrically coupled to the sense resistor. In some embodiments, the second path includes the coil assembly electrically coupled to ground.

In some embodiments of the method 1000, for example, the circuit includes a first sense resistor and a second sense resistor.

In some embodiments of the method 1000, for example, the circuit and the processor are further configured to switch current from a first path to a second path. In some embodiments, the first path includes the coil assembly electrically coupled to the first sense resistor and electrically isolated from the second sense resistor. In some embodiments, the second path includes the coil assembly electrically coupled to the second sense resistor and electrically isolated from the first sense resistor.

In some embodiments of the method 1000, for example, the first signal is an alternating current signal.

In some embodiments of the method 1000, for example, the first signal is a high frequency signal.

In some embodiments of the method 1000, for example, the input structure includes a button.

In some embodiments of the method 1000, for example, a device includes a housing defining an opening; a button positioned at least partially within the opening and moveable with respect to the housing; a coil assembly including a casing, and a coil disposed in the casing, the coil assembly mechanically coupled to the button such that movement of the button causes movement of the coil assembly; a stator connected within the housing with a surface of the stator separated from a surface of the casing, forming a gap; one or more force sensors mechanically coupled to one or both of the button or the coil assembly; and a flexible printed circuit board disposed within the housing. In some embodiments, one or more first wires connect the flexible printed circuit board to the coil. In some embodiments, one or more second wires connect the flexible printed circuit board to the one or more force sensors.

In some embodiments of the method 1000, for example, the stator is mechanically coupled to the button such that movement of the button causes movement of the stator. In some embodiments, the coil assembly is connected within the housing with a surface of the coil assembly separated from the surface of the stator, forming the gap.

In some embodiments of the method 1000, for example, the flexible printed circuit board includes voltage common mode buffer circuitry.

In some embodiments of the method 1000, for example, the flexible printed circuit board includes an analog-to-digital converter circuit and a digital signal processing circuit.

In some embodiments of the method 1000, for example, the device further includes a processor operatively coupled to the flexible printed circuit board. In some embodiments, the processor and the flexible printed circuit board are configured to: drive a first signal through the coil assembly; and determine a distance of the gap based at least in part on an impedance of the coil assembly when driving the first signal through the coil assembly.

Figure 11:
FIG. 11 shows an example of an electrical block diagram of an electronic device.
Figure 11:
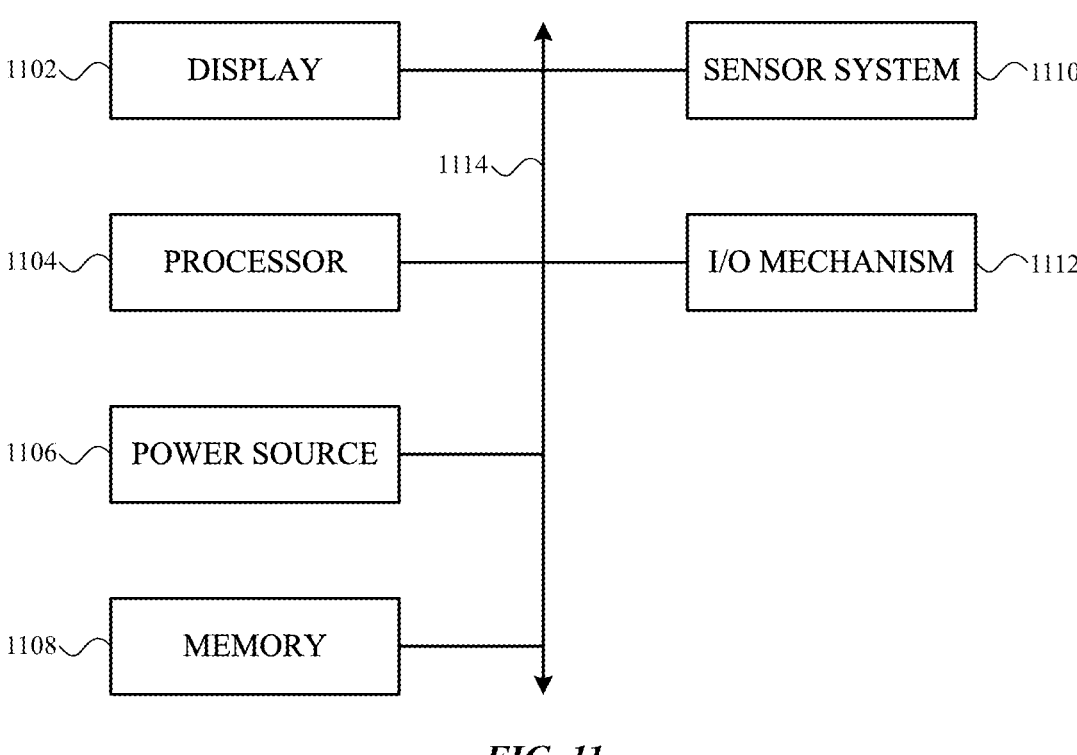

FIG. 11 shows an electrical block diagram of an electronic device 1100, which may be the electronic device described with reference to FIGS. 1A-1C. The electronic device 1100 may include a display 1102 (e.g., a light-emitting display), a processor 1104, a power source 1106, a memory 1108 or storage device, a sensor system 1110, and an input/output (I/O) mechanism 1112 (e.g., an input/output device and/or input/output port). The processor 1104 may control some or all of the operations of the electronic device 1100. The processor 1104 may communicate, either directly or indirectly, with substantially all of the components of the electronic device 1100. For example, a system bus or other communication mechanism 1114 may provide communication between the processor 1104, the power source 1106, the memory 1108, the sensor system 1110, and/or the I/O mechanism 1112.

The processor 1104 may be implemented as any electronic device capable of processing, receiving, or transmitting data or instructions. For example, the processor 1104 may be a microprocessor, a central processing unit (CPU), an application-specific integrated circuit (ASIC), a digital signal processor (DSP), or combinations of such devices. As described herein, the term "processor" is meant to encompass a single processor or processing unit, multiple processors, multiple processing units, or other suitably configured computing element or elements. In some embodiments, the processor 1104 may include in whole or part, be an example of, or be operatively coupled with the gap sensing circuits as described herein.

In some embodiments, the components of the electronic device 1100 may be controlled by multiple processors. For example, select components of the electronic device 1100 may be controlled by a first processor and other components of the electronic device 1100 may be controlled by a second processor, where the first and second processors may or may not be in communication with each other.

The power source 1106 may be implemented with any device capable of providing energy to the electronic device 1100. For example, the power source 1106 may be one or more batteries or rechargeable batteries. Additionally or alternatively, the power source 1106 may be a power connector or power cord that connects the electronic device 1100 to another power source, such as a wall outlet.

The memory 1108 may store electronic data that may be used by the electronic device 1100. For example, the memory 1108 may store electrical data or content such as, for example, audio and video files, documents and applications, device settings and user preferences, timing signals, control signals, data structures or databases, image data, or focus settings. The memory 1108 may be configured as any type of memory. By way of example only, the memory 1108 may be implemented as random access memory, read-only memory, Flash memory, removable memory, other types of storage elements, or combinations of such devices.

The electronic device 1100 may also include one or more sensors defining the sensor system 1110. The sensors may be positioned substantially anywhere on the electronic device 1100. The sensor(s) may be configured to sense substantially any type of characteristic, such as but not limited to, touch, force, pressure, light, heat, movement, relative motion, biometric data, and so on. For example, the sensor system 1110 may include a touch sensor, a force sensor, a heat sensor, a position sensor, a light or optical sensor, an accelerometer, a pressure sensor (e.g., a pressure transducer), a gyroscope, a magnetometer, a health monitoring sensor, and so on. Additionally, the one or more sensors may utilize any suitable sensing technology, including, but not limited to, capacitive, ultrasonic, resistive, optical, ultrasound, piezoelectric, and thermal sensing technology. In some embodiments, the sensor(s) may include the force sensor in any of the modules or button assemblies described herein.

The I/O mechanism 1112 may transmit and/or receive data from a user or another electronic device. An I/O device may include a display, a touch sensing input surface such as a track pad, one or more buttons (e.g., a graphical user interface "home" button, or one of the buttons described herein), one or more cameras, one or more microphones or speakers, one or more ports such as a microphone port, and/or a keyboard. Additionally or alternatively, an I/O device or port may transmit electronic signals via a communications network, such as a wireless and/or wired network connection. Examples of wireless and wired network connections include, but are not limited to, cellular, Wi-Fi, Bluetooth, IR, and Ethernet connections. The I/O mechanism 1112 may also provide feedback (e.g., a haptic output) to a user, and may include the haptic engine of any of the modules or button assemblies described herein.

Any of the above described embodiments may be combined with any other embodiment (or combination of embodiments), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

What is claimed is:

1. An electronic device comprising:
a plurality of housing elements;
an input structure at least partially moveable with respect to at least one housing element of the plurality of housing elements;
a coil assembly mechanically coupled to the input structure such that movement of the input structure causes movement of the coil assembly;
a stator having a surface that is separated by a gap from a surface of the coil assembly; and
a circuit operatively coupled to a processor and comprising a first sense resistor and a second sense resistor, the circuit and the processor configured to:
drive a first signal through the coil assembly;
determine a distance of the gap, the determination based at least in part on an impedance of the coil assembly when driving the first signal through the coil assembly; and
switch current from a first path to a second path, wherein:
the first path includes the coil assembly electrically coupled to the first sense resistor and electrically isolated from the second sense resistor; and
the second path includes the coil assembly electrically coupled to the second sense resistor and electrically isolated from the first sense resistor.

2. The electronic device of claim 1, wherein:

the stator is mechanically coupled to a button such that movement of the button causes movement of the stator; and the coil assembly is connected within a housing defined by the plurality of housing elements with the surface of the coil assembly separated from the surface of the stator, forming the gap.

3. The electronic device of claim 1, wherein the circuit and the processor are further configured to:

drive a second signal different from the first signal through the coil assembly; wherein:

a power of the second signal is based at least in part on the determined distance of the gap.

4. The electronic device of claim 3, wherein:

the second signal is a single ended signal.

5. The electronic device of claim 3, wherein:

the second signal has a frequency different from the first signal.

6. The electronic device of claim 1, further comprising:

a force sensor mechanically coupled to the coil assembly and electrically coupled to the circuit; wherein the circuit and the processor are further configured to:

determine the distance of the gap based at least in part on a signal from the force sensor.

7. The electronic device of claim 1, wherein:

the first signal is an alternating current signal.

8. A device comprising:

a housing defining an opening;

a button positioned at least partially within the opening and moveable with respect to the housing;

a coil assembly comprising a casing, and a coil disposed in the casing, the coil assembly mechanically coupled to the button such that movement of the button causes movement of the coil assembly;

a stator connected within the housing with a surface of the stator separated from a surface of the casing, forming a gap;

one or more force sensors mechanically coupled to one or both of the button or the coil assembly;

a flexible printed circuit board disposed within the housing; wherein:

one or more first wires connect the flexible printed circuit board to the coil; and one or more second wires connect the flexible printed circuit board to the one or more force sensors; and a processor operatively coupled to the flexible printed circuit board, the processor and the flexible printed circuit board configured to:

drive a first signal through the coil assembly; and determine a distance of the gap, the determination based at least in part on impedance of the coil assembly when driving the first signal through the coil assembly.

9. The device of claim 8, wherein:

the stator is mechanically coupled to the button such that movement of the button causes movement of the stator; and the coil assembly is connected within the housing with a surface of the coil assembly separated from the surface of the stator, forming the gap.

10. The device of claim 8, wherein the flexible printed circuit board comprises voltage common mode buffer circuitry.

11. The device of claim 8, wherein the flexible printed circuit board comprises an analog-to-digital converter circuit and a digital signal processing circuit.

12. A method of sensing a gap via a reluctance engine coil, for controlling haptic output, comprising:

switching a circuit from a haptic drive mode to an inductive sensing mode;

applying, via the circuit in the inductive sensing mode, a first signal to the reluctance engine coil;

measuring a voltage from a force sensor mechanically coupled to the reluctance engine coil;

measuring, via the circuit in the inductive sensing mode, an inductance and resistance of the reluctance engine coil, the measuring based at least in part on the first signal;

determining, via the circuit in the inductive sensing mode, a distance of the gap associated with the reluctance engine coil and a stator, the determination based at least in part on the measured inductance, measured voltage, and measured resistance; and switching the circuit from the inductive sensing mode to the haptic drive mode.

13. The method of claim 12, further comprising:

applying, via the circuit in the haptic drive mode, a second signal different from the first signal to the reluctance engine coil; wherein:

a power of the second signal is based at least in part on the determined distance of the gap.

* * * * *